US012125417B2

(12) United States Patent
Ehara

(10) Patent No.: US 12,125,417 B2
(45) Date of Patent: Oct. 22, 2024

(54) LABEL, LABEL WRAPPING METHOD AND LABEL SHEET

(71) Applicant: MAX CO., LTD., Tokyo (JP)

(72) Inventor: Takayuki Ehara, Tokyo (JP)

(73) Assignee: Max Co., Ltd., Tokyo (JP)

( * ) Notice: Subject to any disclaimer, the term of this patent is extended or adjusted under 35 U.S.C. 154(b) by 195 days.

(21) Appl. No.: 17/320,311

(22) Filed: May 14, 2021

(65) Prior Publication Data

US 2021/0358338 A1 Nov. 18, 2021

(30) Foreign Application Priority Data

May 15, 2020 (JP) ................................ 2020-085778

(51) Int. Cl.
*G09F 3/02* (2006.01)

(52) U.S. Cl.
CPC .. *G09F 3/02883* (2021.05); *G09F 2003/0226* (2013.01); *G09F 2003/023* (2013.01); *G09F 2003/0251* (2013.01); *G09F 2003/0257* (2013.01)

(58) Field of Classification Search
CPC ......... G09F 3/02883; G09F 2003/0226; G09F 2003/023; G09F 2003/0251; G09F 2003/0257; G09F 3/0295; G09F 3/205
See application file for complete search history.

(56) References Cited

U.S. PATENT DOCUMENTS

| | | | | |
|---|---|---|---|---|
| 4,916,841 A * | 4/1990 | Dawson | G09F 3/14 40/6 |
| 6,016,618 A * | 1/2000 | Attia | G09F 3/005 156/289 |
| 9,984,596 B2 | 5/2018 | Kyogane et al. | |
| 10,249,221 B2 | 4/2019 | Davis et al. | |
| 2008/0116284 A1* | 5/2008 | Gordon | G09F 3/0288 235/487 |
| 2009/0277570 A1 | 11/2009 | Caveney et al. | |
| 2012/0308756 A1 | 12/2012 | Caveney et al. | |

(Continued)

FOREIGN PATENT DOCUMENTS

| | | | |
|---|---|---|---|
| DE | 4211373 C1 * | 10/1993 | G09F 3/0289 |
| JP | 2003-009329 A | 1/2003 | |

(Continued)

OTHER PUBLICATIONS

Extended European Search Report dated Oct. 21, 2021, issued by the European Patent Office in the corresponding European Patent Application No. 21173843.0. (15 pages).

*Primary Examiner* — Cassandra Davis
(74) *Attorney, Agent, or Firm* — Banner & Witcoff, Ltd.

(57) ABSTRACT

A label has a front surface and a back surface provided on an opposite side to the front surface and capable of being wrapped around a cable extending in a first direction. The label includes: a first part; and a second part adjacent to the first part in the first direction. The first part has a first protruding portion further protruding than the second part in a second direction perpendicular to the first direction and having a first adhesive surface on the back surface, and wherein the second part has a second protruding portion further protruding than the first part in a third direction opposite to the second direction and having a second adhesive surface on the back surface.

10 Claims, 14 Drawing Sheets

(56) References Cited

U.S. PATENT DOCUMENTS

| | | | |
|---|---|---|---|
| 2015/0007929 A1 | 1/2015 | Caveney et al. | |
| 2017/0004740 A1 | 1/2017 | Caveney et al. | |
| 2017/0124918 A1 | 5/2017 | Davis et al. | |
| 2018/0015739 A1* | 1/2018 | Sun | B41J 11/663 |
| 2019/0001714 A1 | 1/2019 | Inoue et al. | |
| 2019/0244546 A1 | 8/2019 | Caveney et al. | |
| 2020/0082739 A1 | 3/2020 | Caveney et al. | |
| 2020/0258429 A1 | 8/2020 | Caveney et al. | |

FOREIGN PATENT DOCUMENTS

| | | |
|---|---|---|
| JP | 2003-058062 A | 2/2003 |
| JP | 2007-033551 A | 2/2007 |
| JP | 2011-524154 A | 8/2011 |
| JP | 2016-071030 A | 5/2016 |
| JP | 2019-179104 A | 10/2019 |
| JP | 2019-179105 A | 10/2019 |

* cited by examiner

1100C

1100D

LABEL, LABEL WRAPPING METHOD AND LABEL SHEET

CROSS-REFERENCE TO RELATED APPLICATIONS

This application is based on and claims priority under 35 USC 119 from Japanese Patent Application No. 2020-085778 filed on May 15, 2020, the contents of which are incorporated herein by reference.

TECHNICAL FIELD

The present disclosure relates to a label, a label wrapping method and a label sheet.

BACKGROUND ART

In order to identify a cable such as an optical fiber, an electric wire and the like from other cables, a label for wrapping around the cable is known.

JP-A-2016-071030 (hereinafter, referred to as PTL 1) discloses a self-laminating rotating label. A film of the self-laminating rotating label has a first adhesive area, a non-adhesive area adjacent to the first adhesive area, and a second adhesive area adjacent to the non-adhesive area. The film is also formed with a cut for cutting the second adhesive area. According to the self-laminating rotating label, it is possible to remove a broken piece of the film, which includes the first adhesive area adhering to a cable when wrapped around the cable, from the cable by using the cut. For this reason, the self-laminating rotating label can rotate around the cable and move in an extension direction of the cable.

JP-A-2011-524154 (hereinafter, referred to as PTL 2) discloses a cable identifying label configured to rotate around a cable so as to read the label in any position. The cable identifying label has a first part on which a bonding agent is applied, and a second part on which the bonding agent is not applied, and a perforation is formed at a boundary between the first part and the second part. According to the cable identifying label, it is possible to separate the first part and the second part, which adhere to the cable when wrapped around the cable, by using the perforation. For this reason, the cable identifying label including the separated second part can rotate around the cable and move in an extension direction of the cable.

JP-A-2003-009329 (hereinafter, referred to as PTL 3) discloses an identifying tag that is wrapped around a communication cable. The tag adheres to a surface of a spiral tube that is rotatably wrapped around an outer peripheral surface of the communication cable. According to the identifying tag, it is possible to rotate the tag around the cable by rotating the spiral tube.

However, according to the self-laminating rotating label disclosed in PTL 1, it is necessary to discard the broken piece of the film removed from the cable. According to the cable identifying label disclosed in PTL 2, the first part remains on the cable. According to the identifying tag disclosed in PTL 3, it is necessary to wrap the separate member referred to as a spiral tube around the cable.

It is therefore an object of the present disclosure to provide a label, a label wrapping method and a label sheet capable of eliminating a broken piece of a film to be discarded and a part remaining on a cable after wrapped around the cable.

SUMMARY OF INVENTION

A label of the present disclosure has a front surface and a back surface provided on an opposite side to the front surface and capable of being wrapped around a cable extending in a first direction. The label includes: a first part; and a second part adjacent to the first part in the first direction. The first part has a first protruding portion further protruding than the second part in a second direction perpendicular to the first direction and having a first adhesive surface on the back surface, and the second part has a second protruding portion further protruding than the first part in a third direction opposite to the second direction and having a second adhesive surface on the back surface.

A label of the present disclosure has a front surface and a back surface provided on an opposite side to the front surface and capable of being wrapped around a cable extending in a first direction. The label includes: a first part; and a second part adjacent to the first part in the first direction. An area of an end portion of the first part in a second direction perpendicular to the first direction is smaller than an area of an end portion of the second part in the second direction, and a back surface of the end portion of the second part in the second direction has an adhesive surface, and an area of an end portion of the first part in a third direction opposite to the second direction is greater than the area of the end portion of the second part in the second direction, and a back surface of the end portion of the first part in the third direction has a second adhesive surface.

A label of the present disclosure has a front surface and a back surface provided on an opposite side to the front surface and capable of being wrapped around a cable extending in a first direction. The first surface has: a first adhesive surface provided at an end portion in a second direction perpendicular to the first direction, and a first non-adhesive surface adjacent to the first adhesive surface in a third direction opposite to the second direction. The second surface has: a second adhesive surface provided at an end portion in the third direction, and a second non-adhesive surface adjacent to the second adhesive surface in the second direction.

A label wrapping method of the present disclosure is a method for wrapping a label around a cable extending in a first direction related to the present disclosure, in which the label has a first surface and a second surface provided on an opposite side to the first surface and is capable of being wrapped around the cable, the first surface has a first adhesive surface provided at an end portion in a second direction perpendicular to the first direction and a first non-adhesive surface adjacent to the first adhesive surface in a third direction opposite to the second direction, and the second surface has a second adhesive surface provided at an end portion in the third direction and a second non-adhesive surface adjacent to the second adhesive surface in the second direction. The label wrapping method includes: causing the first adhesive surface to adhere to the cable; folding the label so that the second surface faces the cable; wrapping the label around the cable so that the first surface is exposed; and causing the second adhesive surface to adhere to the first surface.

A label of the present disclosure sheet has a release paper and a label paper bonded to the release paper. The label paper has a plurality of the labels described above, in which the first adhesive surface and the second adhesive surface adhere to the release paper.

A label of the present disclosure has a first surface that is to be an adhesive surface and a second surface that is provided on an opposite side to the first surface and is to be a non-adhesive surface. The label includes: a first part; and a second part adjacent to the first part in the first direction. When bending the label along a boundary between the first part and the second part so that the first part and the second part overlap each other, the adhesive surface of an end portion of the second part in a second direction perpendicular to the first direction is exposed toward one side, and the adhesive surface of an end portion of the first part in a third direction perpendicular to the first direction and opposite to the second direction is exposed toward the other side.

DESCRIPTION OF EMBODIMENTS

Hereinafter, embodiments of the present disclosure will be described with reference to the drawings. The embodiments are just examples for illustrating the present disclosure, and are not intended to limit the present disclosure.

Figure 1A:
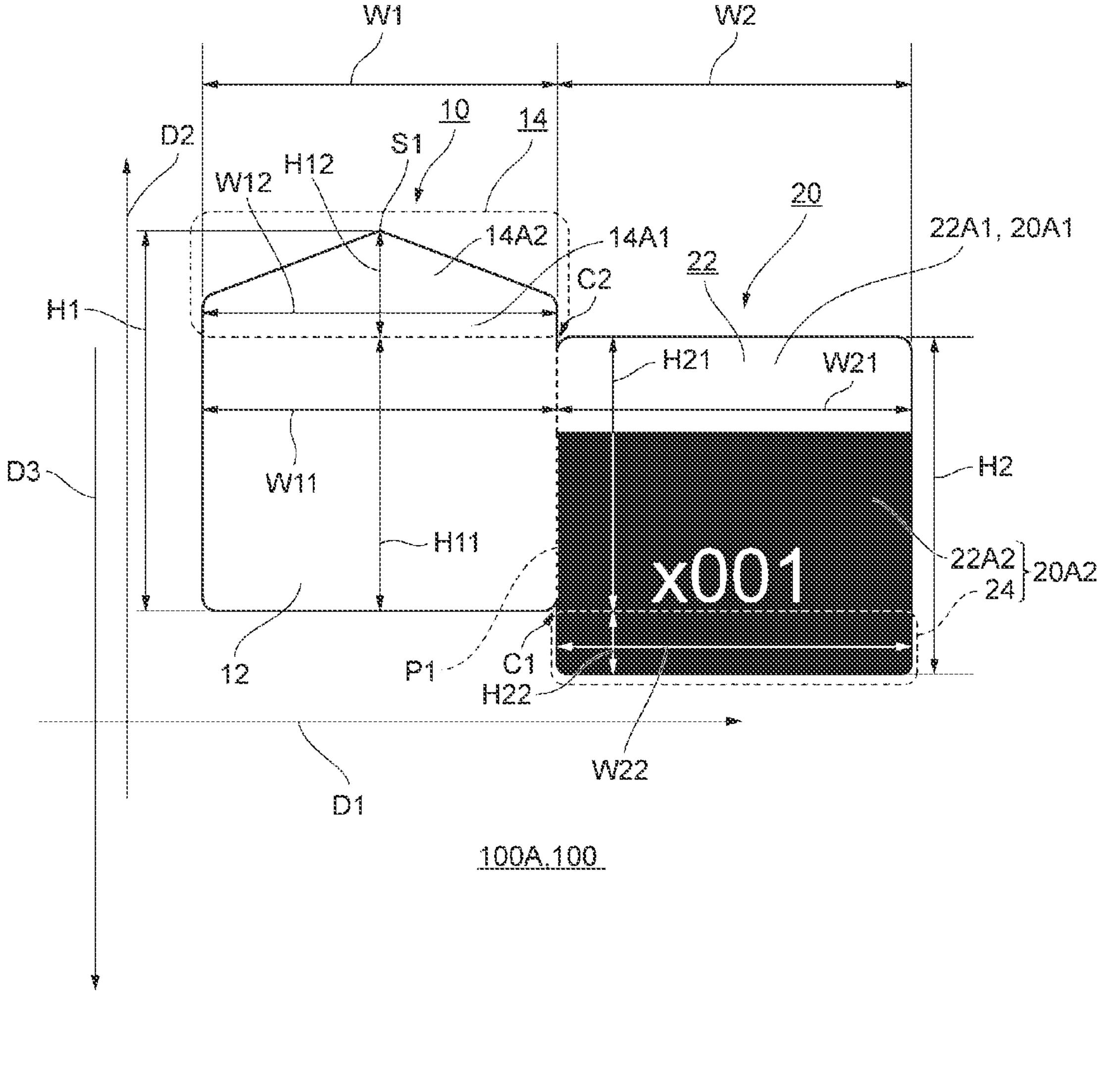
FIG. 1A shows a front surface 100A of a label 100.
Figure 1B:
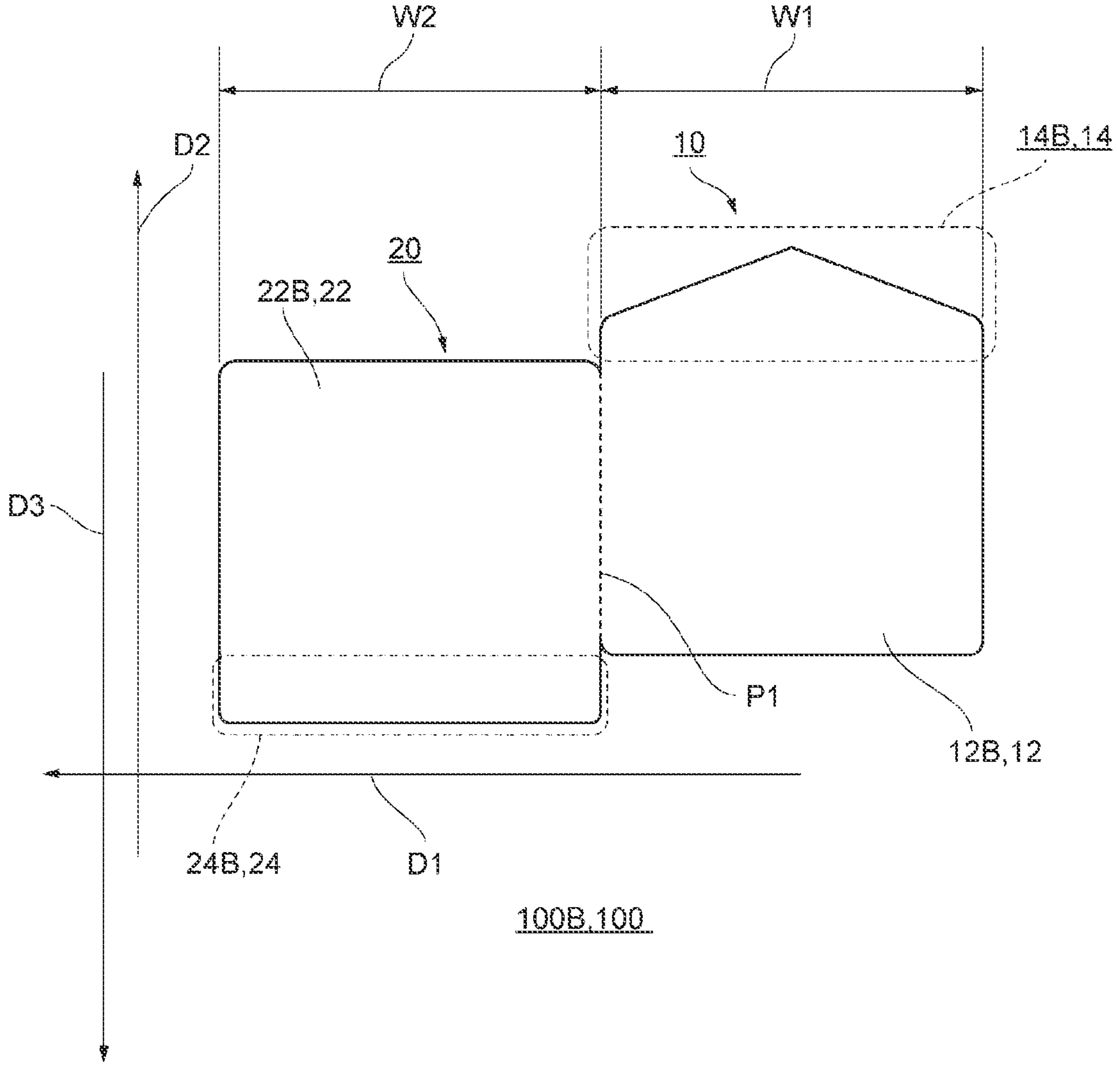
FIG. 1B shows a back surface 100B of the label 100.

FIG. 1A shows a front surface 100A of a label 100 according to a first embodiment, and FIG. 1B shows a back surface 100B of the label 100. For convenience, a right direction on the drawing sheet of FIG. 1A is defined as a first direction D1, an upward direction on the drawing sheet is defined as a second direction D2, and a downward direction on the drawing sheet is defined as a third direction D3. The second direction D2 and the third direction D3 are each orthogonal to the first direction D1. The second direction D2 and in the third direction D3 are opposite directions. However, for quantities having no directions such as a height, a width and the like, the second direction D2 and the third direction D3 are used without identification, and may be shown in the drawings without identification of the directions.

The label 100 can be wrapped around a cable extending in the first direction D1. It is possible to identify a plurality of cables by describing information for identifying the cables on a front surface of the label 100. Hereinafter, a configuration of the label 100 is described.

The front surface 100A of the label 100 is a printable non-adhesive surface on which neither the bonding agent nor the adhesive is applied. The back surface 100B is an adhesive surface on which the adhesive is applied. Therefore, the back surface 100B can adhere to each other. The back surface 100B can also adhere to the front surface 100A.

As shown in FIG. 1A, the label 100 has a first part 10, and a second part 20 adjacent to the first part 10 in the first direction D1.

The first part 10 has a first bonding portion 12 connecting to the second part 20, and a first protruding portion 14 adjacent to the first bonding portion 12 in the second direction D2 and further protruding than the second part 20 in the second direction D2. As described later, the first protruding portion 14 functions as an anchor.

In the present embodiment, the first bonding portion 12 has a rectangular shape having a width W1 in the first direction D1 and a height H11 in the second direction D2. The first protruding portion 14 adjacent to the first bonding portion 12 in the second direction D2 has a rectangular portion 14A1 connecting to the first bonding portion 12 and a tip end portion 14A2 connecting to the rectangular portion 14A1 and having a width in the first direction D1 that becomes gradually smaller in the second direction D2.

In the present embodiment, the first protruding portion 14 has a width W1 in the first direction D1 and a height H12 in the second direction D2. As described later, the first bonding portion 12 is a portion that overlaps the second bonding portion 22 and is then wrapped inward so as to face a surface of a cable. The first protruding portion 14 becomes an anchor that temporarily adheres to the cable and is then peeled off from the cable. For this reason, the height H11 of the first bonding portion 12 is set according to a circumferential length of a cable that is a wrapping target, and is preferably set to be substantially the same or greater than the circumferential length of the cable. On the other hand, the height H12 of the first protruding portion 14 is preferably set to be smaller than the circumferential length of the cable, and more preferably, to be smaller than a half of the circumferential length of the cable, considering easy peeling from the cable. For this reason, the height H12 of the first protruding portion 14 is preferably smaller than the height H11, and more preferably, smaller than a half of the height H11. In the present embodiment, the tip end portion 14A2 has a triangular shape where a bottom side has the width W1, the width in the first direction D1 becomes gradually smaller in the second direction D2 and an apex S1 is formed at a tip end in the second direction D2. The tip end portion 14A2 is formed so that the width in the first direction D1 becomes gradually smaller in the second direction D2. In this way, as described later, the tip end portion 14A2 can easily adhere to the cable and can be then easily peeled off from the cable.

The first part 10 of the label 100 configured as described above has the width W1 (an example of the "first width") in the first direction D1 and the height H1 (an example of the "first height") in the second direction D2. Here, the height H1 of the first part 10 corresponds to the entire height of the first part 10, and in the present embodiment, is a sum of the height H11 of the first bonding portion 12 and the height H12 of the first protruding portion 14. The width W1 of the first part 10 corresponds to the entire width of the first part 10, and in the present embodiment, is the same as the width W11 of the first bonding portion 12 and the width W12 of the first protruding portion 14.

The second part 20 has a second bonding portion 22 connecting to the first bonding portion 12, and a second protruding portion 24 adjacent to the second bonding portion 22 in the third direction D3 and further protruding than the first part 10 in the third direction D3.

In the present embodiment, the second bonding portion 22 has a rectangular shape having a width W21 in the first direction D1 and a height H21 in the third direction D3. In the present embodiment, the height H11 and the height H21 are the same. The second protruding portion 24 adjacent to the second bonding portion 22 in the third direction D3 has a rectangular shape having a width W22 in the first direction D1 and a height H22 in the third direction D3. As described later, the second bonding portion 22 is a portion that overlaps the first bonding portion 22, is wrapped around the cable with facing outward and is thus mostly exposed. The second protruding portion 24 is a portion that adheres to an end portion 22A1 of the second bonding portion 22 in the second direction D2 and is thus exposed. For this reason, the height H21 of the second bonding portion 22 is set according to a circumferential length of a cable, that is a wrapping target, and is preferably set to be substantially the same or greater than the circumferential length of the cable. The height H22 of the second protruding portion 24 is preferably set to be smaller than the circumferential length of the cable, and more preferably, to be smaller than a half of the circumferential length of the cable, considering easy adhesion to the end portion 22A1 of the second bonding portion 22 in the second direction D2. For this reason, the height H22 is preferably smaller than the height H21, and more preferably, smaller than a half of the height H21. In addition, the second protruding portion 24 is preferably formed to have a rectangular shape so that the second protruding portion 24 is difficult to be peeled off after it adheres to the end portion 22A1 in the second direction D2. The second protruding portion 24 is formed to have a rectangular shape, so that it can adhere to the end portion 22A1 in the second direction D2 over the first direction D1.

A front surface of the end portion 22A1 of the second part 20 in the second direction D2 is an overlap width area 20A1 for adhering to a back surface of the second protruding portion 24. Note that, a portion of the second part 20 except the end portion 22A1 in the second direction D2, i.e., an intermediate portion 22A2 adjacent to the end portion 22A1 in the second direction D2 in the third direction D3 and the second protruding portion 24 adjacent to the intermediate portion 22A2 are a print area 20A2 exposed outward. For this reason, as shown in FIG. 1A, a character string "x001" for identifying a cable that is a wrapping target is indicated in the print area 20A2. In the present embodiment, a coloring agent such as black is printed in an area except the character string, and a coloring material is not printed on the character string so that the character string can be identified. By such configuration, a user can easily perceive a manner of wrapping a label around a cable by bending the label so that the second part 20, which includes the print area 20A2 in which the coloring agent is printed, is directed outward.

Note that, the information such as the character string for identifying the cable is not preferably printed in the overlap width area 20A1. In general, an attaching force of the coloring agent or the like falls below the bonding force of the adhesive or the bonding agent or is not uniform depending on printing conditions. Therefore, when the coloring material or the like is not printed in the overlap width area 20A1, it is possible to increase the bonding force to the second protruding portion 24, as compared to a case where the coloring agent or the like is printed.

The second part 20 of the label 100 configured as described above has the width W2 (an example of the "second width") in the first direction D1 and the height H2 (an example of the "second height") in the third direction D3. Here, the height H2 of the second part 20 corresponds to the entire height of the second part 20, and in the present embodiment, is a sum of the height H21 of the second bonding portion 32 and the height H22 of the second protruding portion 24. The width W2 of the second part 20 corresponds to the entire width of the second part 20, and in the present embodiment, is the same as the width W21 of the second bonding portion 22 and the width W22 of the second protruding portion 24.

The width W1 of the first part 10 and the width W2 of the second part 20 are preferably the same or substantially the same (for example, the width W2 is equal to or greater than 90% and smaller than 110% of the width W1). By such configuration, when the first part 10 and the second part 20 are overlapped, the adhesive (or the bonding agent) can be suppressed from being exposed at a portion except the first protruding portion 14 and the second protruding portion 24. However, as shown in an embodiment to be described later, the width of the first protruding portion 14 may also be formed to be smaller than the width W1. In addition, the width W22 of the second protruding portion 24 may also be formed to be smaller than the width W2.

Further, the height H11 of the first bonding portion 12 and the height H21 of the second bonding portion 22 are preferably the same or substantially the same (for example, the height H21 is equal to or greater than 90% and smaller than 110% of the height H11). By such configuration, when the first part 10 and the second part 20 are overlapped, the adhesive (or the bonding agent) can be suppressed from being exposed at a portion except the first protruding portion 14 and the second protruding portion 24.

As shown in FIGS. 1A and 1B, at a connection portion of the first part 10 and the second part 20, an end of the second part 20 in the second direction D2 is formed with a cut C2 so that a height of the second part 20 in the third direction D3 is smaller than a peripheral portion. In addition, at the connection portion, an end of the first part 10 in the third direction D3 is formed with a cut C1 so that a height of the first part 10 in the second direction D2 is smaller than a peripheral portion. The cuts C1 and C2 are formed, so that the label 100 can be easily bent at a boundary between the first part 10 and the second part 20.

FIG. 1B shows the back surface 100B of the label 100. In the present embodiment, the adhesive is applied on the entire surface of the back surface 100B. Specifically, the entire area of the back surface of the first protruding portion 14 is provided with a first adhesive surface 14B, the entire area (a portion except the back surface of the first protruding portion 14) of the back surface of the first bonding portion 12 is provided with a third adhesive surface 12B, the entire area (a portion except the back surface of the second protruding portion 24) of the back surface of the second protruding portion 24 is provided with a second adhesive surface 24B, and the entire area of the back surface of the second bonding portion 22 is provided with a fourth adhesive surface 22B.

However, the present disclosure is not limited thereto. For example, the first adhesive surface may be provided in at least a partial area of the back surface of the first protruding portion 14, and the second adhesive surface may be provided in at least a partial area of the back surface of the second protruding portion 24. For example, the first adhesive surface may be provided only on an outer edge portion of the back surface of the first protruding portion 14. In addition, the third adhesive surface or the fourth adhesive surface may be provided only on a part of the back surface of any one of the first bonding portion 12 and the second bonding portion 22. For example, the third adhesive surface may be provided only on an outer edge portion of the back surface of the first bonding portion 12, and no adhesive surface may be provided on the back surface of the second bonding portion 22.

As shown in FIG. 1A, a perforation P1 (an example of the “fold”) extending in the second direction D2 is provided at the boundary between the first part 10 and the second part 20. The perforation P1 is formed by intermittently removing portions of the label 100. However, the fold may also be formed by forming a plurality of small holes penetrating the label 100. Further, a “fold line” may also be formed by applying a pressure to a front surface of a label.

Figure 2A:
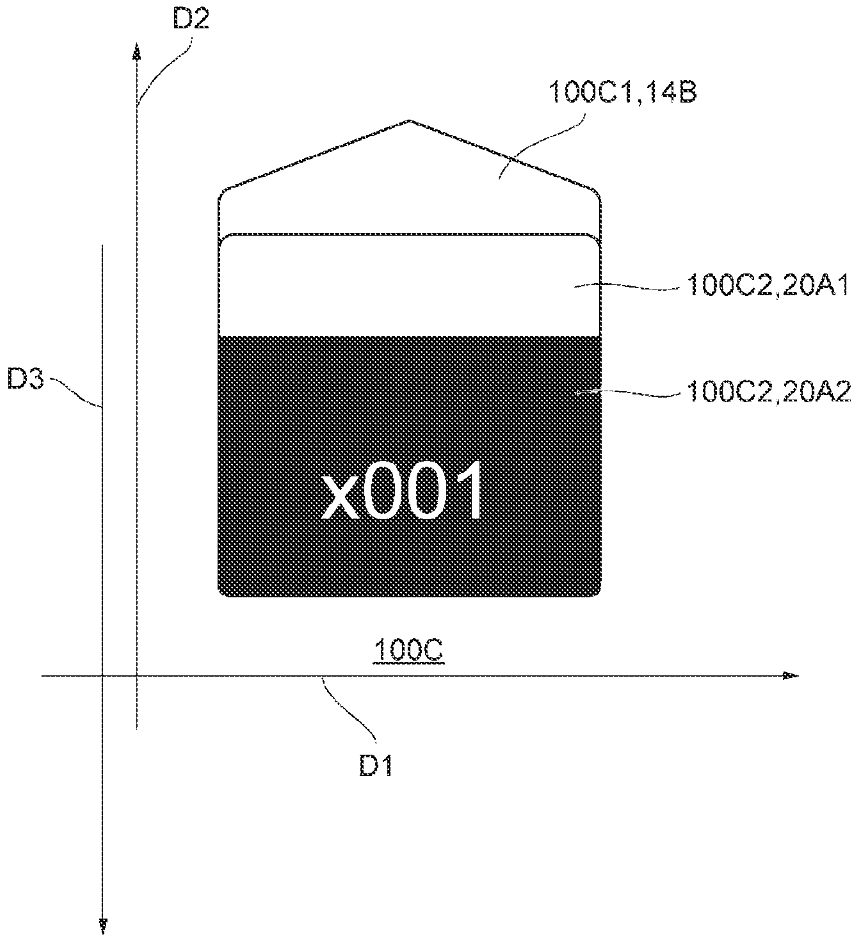
FIG. 2A shows a first surface 100C of the label 100.
Figure 2B:
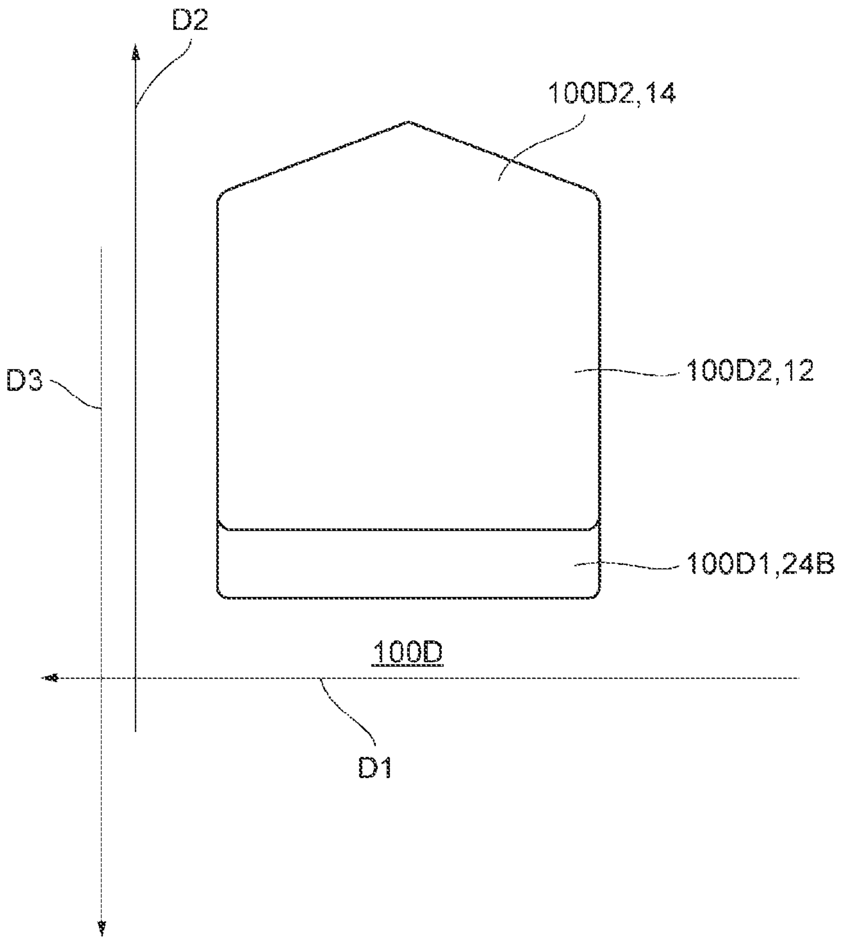
FIG. 2B shows a second surface 100D of the label 100.

FIGS. 2A and 2B show the label 100 where the third adhesive surface 12B and the fourth adhesive surface 22B adhere to each other by bending the label 100 along the perforation P1. The front surface of the label 100 where the third adhesive surface 12B and the fourth adhesive surface 22B adhere to each other, when seeing the label in a direction facing the second part 20, is referred to as a first surface 100C (FIG. 2A), and the front surface when seeing the label in a direction facing the first part 10, is referred to as a second surface 100D (FIG. 2B). The second surface 100D is provided on an opposite side to the first surface 100C. FIG. 3A is a side view of the label 100 where the third adhesive surface and the fourth adhesive surface adhere to each other, in a state where the first part 10 is a lower layer and the second part 20 is an upper layer. Note that, in side views shown in FIG. 3A and the like, for convenience, thicknesses of the first part 10 and the second part 20 are shown greater than normal. Actually, the thicknesses of the first part 10 and the second part 20 are thin enough to be easily wrapped around the cable, and for example, is 1 mm or smaller, for example.

As shown in FIG. 2A, the first surface 100C of the label 100 is provided at an end portion in the second direction D2 with a first adhesive surface 100C1. The first adhesive surface 100C1 corresponds to the first adhesive surface 14B (FIG. 1B) of the back surface of the first protruding portion 14. Since a shape of the first adhesive surface 100C1 is similar to the first protruding portion 14, the description thereof is omitted.

The first surface 100C is also provided with a first non-adhesive surface 100C2 adjacent to the first adhesive surface 100C1 in the third direction D3. The first non-adhesive surface 100C2 is provided with the overlap width area 20A1 and the print area 20A2. For this reason, it can be said that the first surface 100C has the first adhesive surface 100C1 provided at an end portion in the second direction, the overlap width area 20A1 that is adjacent to the first adhesive surface 100C1 in the third direction D3 and is a not-printed surface and a non-adhesive surface, and the print area 20A2 that is adjacent to the overlap width area 20A1 in the third direction D3 and a printed surface and a non-adhesive surface. The print area 20A2 is provided at an end portion of the first surface 100C in the third direction D3.

The first non-adhesive surface 100C2 also corresponds to the second bonding portion 22 and the second protruding portion 24 (FIG. 1B). Since a shape of the first non-adhesive surface 100C2 is similar to the second bonding portion 22 and the second protruding portion 24, the description thereof is omitted.

Figure 3:
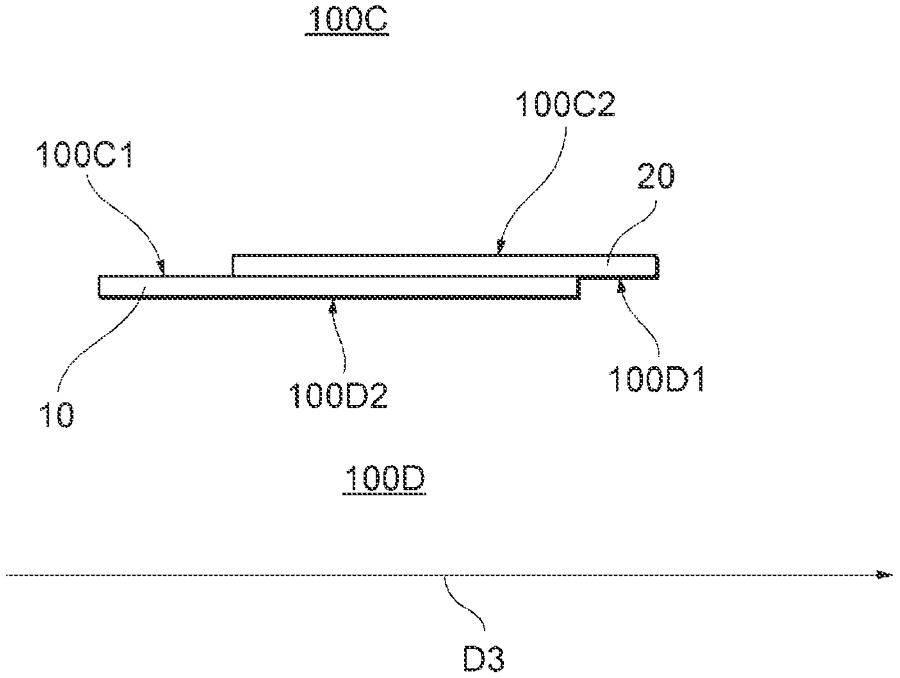
FIG. 3 is a side view of the label 100.

As shown in FIG. 3, the second surface 100D of the label 100 is provided at an end portion in the third direction D3 with a second adhesive surface 100D1. The second adhesive surface 100D1 corresponds to the second adhesive surface 24B (FIG. 1B) of the back surface of the second protruding portion 24. Since a shape of the second adhesive surface 100D1 is similar to the second protruding portion 24, the description thereof is omitted.

The second surface 100D is also provided with a second non-adhesive surface 100D2 adjacent to the second adhesive surface 100D1 in the second direction D2. The second non-adhesive surface 100D2 is provided with the first bonding portion 12 and the first protruding portion 14. For this reason, the second surface 100D has the second adhesive surface 100D1 provided at an end portion in the third direction D3 and the second non-adhesive surface 100D2 adjacent to the second adhesive surface 100D1 in the second direction D2. The second non-adhesive surface 100D2 is provided to include an end portion of the second surface 100D in the second direction D2. Since a shape of the second non-adhesive surface 100D2 is similar to the first bonding portion 12 and the first protruding portion 14, the description thereof is omitted.

As shown in FIG. 3A, the first part 10 and the second part 20 are stacked. In addition, the first part 10 has the first adhesive surface 100C1 on one surface, and the second non-adhesive surface 100D2 on the other surface. The second part 20 has the first non-adhesive surface 100C2 on one surface, and the second adhesive surface 100D1 on the other surface. Note that, the third adhesive surface 12B of the first bonding portion 12 of the first part 10 and the fourth adhesive surface 22B of the second bonding portion 22 of the second part 20 adhere to each other.

Figure 4:
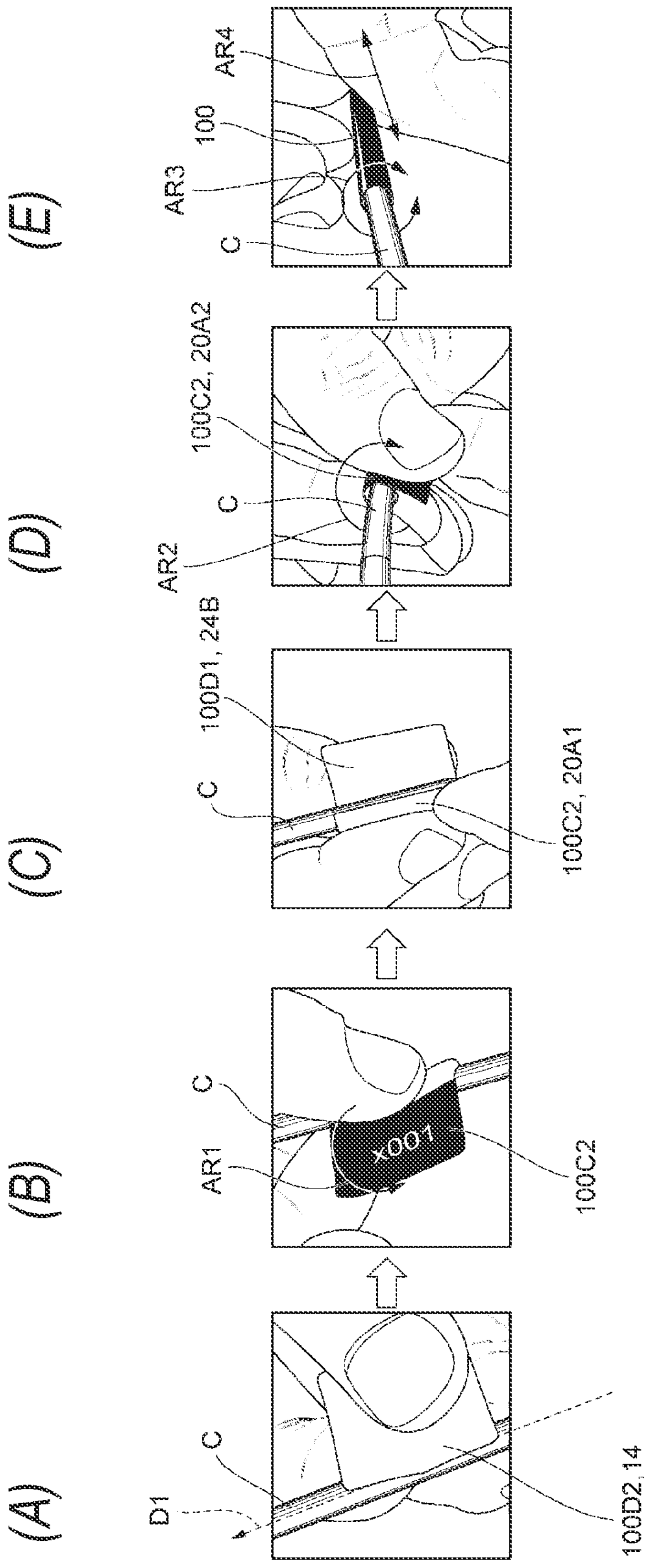
FIG. 4 is a schematic view showing a method for wrapping the label 100.

(A) to (E) of FIG. 4 show a method for wrapping the label 100 shown in FIG. 2A, FIG. 2B and FIG. 3 around a cable C.

As shown in (A) of FIG. 4, the label 100 is wrapped so that an extension direction of the cable C coincides with the first direction D1. First, the first adhesive surface 100C1 of the label 100 is caused to adhere to the surface of the cable C. Here, since the first adhesive surface 100C1 has a shape different from the second adhesive surface 100D1, an operator can easily recognize the first adhesive surface 100C1 corresponding to a part that should be first bonded. In addition, since the first adhesive surface 100C1 has a portion that is gradually narrowed toward a tip end so that the width in the first direction D1 becomes gradually smaller in the second direction D2, a wrinkle or the like is difficult to form in the first adhesive surface 100C1 during adhesion. At this time, the first surface 100C faces the surface of the cable C, and the second surface 100D faces outward.

Then, the label 100 is folded in a direction denoted with an arrow AR1 near a boundary between the first adhesive surface 100C1 and the first non-adhesive surface 100C2 so that the second surface 100D faces the surface of the cable C ((B) of FIG. 4). As shown in (B) of FIG. 4, the first surface 100C faces outward.

Then, the label 100 is wrapped around the cable C so that the first surface 100C is exposed outward and the second surface 100D faces inward the surface of the cable C ((C) of FIG. 4). At this time, since the first adhesive surface 100C1 is in a state of adhering to the surface of the cable C, the label 100 can be easily wrapped around the cable C.

Thereafter, the label 100 is moved relative to the cable C to peel off the first adhesive surface 100C1 from the surface of the cable C ((D) of FIG. 4). For example, by rotating the label 100 relative to the cable C in a direction denoted with an arrow AR2, it is possible to peel off the first adhesive surface 100C1 from the surface of the cable C and to cause the same to adhere to the second non-adhesive surface 100D2. The present inventors performed trial and error by variously changing a shape of a portion corresponding to the first adhesive surface 100C1. As a result, it was found that when the first adhesive surface 100C1 is formed so that the width in the first direction D1 becomes gradually smaller in the second direction D2, i.e., is formed to have a portion that is gradually narrowed toward a tip end, the first adhesive surface 100C1 can be easily peeled off from the surface of the cable C, as compared to a configuration where the width is the same. Since it is possible to set a large peeling angle in peeling off the first adhesive surface 100C1 by folding the label 100, the first adhesive surface 100C1 can be easily peeled off from the cable C. Further, since the first adhesive surface 100C1 has a portion that is gradually narrowed toward a tip end, and hence, the width of the adhesive surface to be sequentially peeled off becomes smaller, the first adhesive surface 100C1 can be peeled off with less force.

Note that, the step of moving the label 100 relative to the cable C to peel off the first adhesive surface 100C1 from the surface of the cable C is not necessarily required. The reason is that even though this step is not executed, the label 100 can be wrapped around the cable C. This step may be executed when it becomes necessary to move the label L100 relative to the cable.

Finally, the wrapping of the label 100 around the cable is completed by causing the second adhesive surface 100D1 to adhere to the first surface 100C ((E) of FIG. 4). Here, it is possible to improve the bonding force by causing the second adhesive surface 100D1 to adhere to the not-printed overlap width area 20A1 of the first surface 100C.

Since the first adhesive surface 100C1 is peeled off from the cable C, the label 100 wrapped around the cable C in this way can be moved in a direction of an arrow AR4 ((E) of FIG. 4), which is the extension direction of the cable C, and can also be rotated in a direction of an arrow AR 3 ((E) of FIG. 4), which is a circumferential direction.

Figure 5:
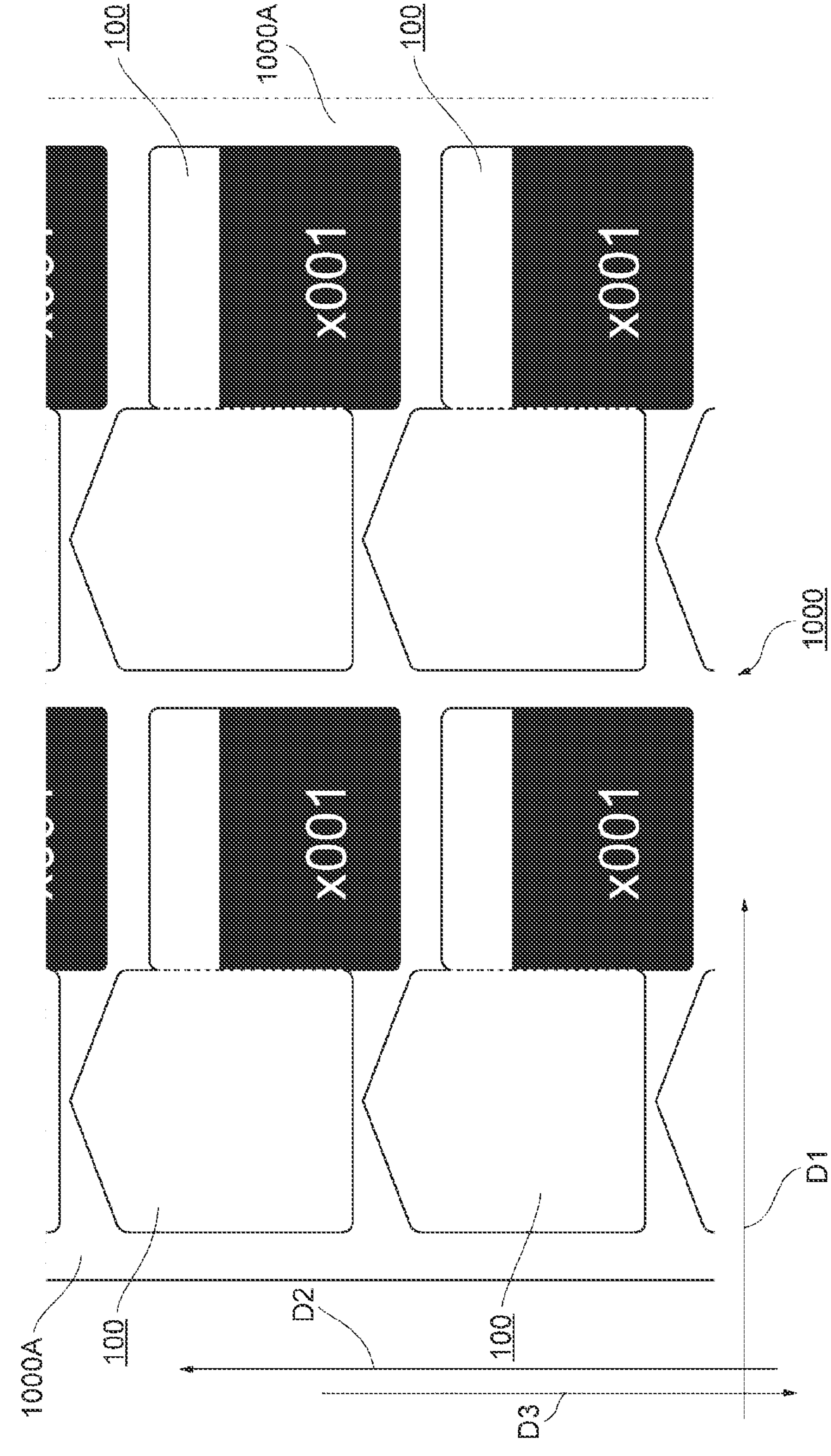
FIG. 5 shows a front surface of a label sheet 1000.

FIG. 5 shows a label sheet 1000 having a plurality of the labels 100. The label sheet 1000 has a release paper and a label paper 1000A bonded to the release paper. The label paper 1000A is a paper (including a paper or resin film that is entirely or partially made of laminate paper) having a surface on which ink and the like can be printed. The label paper 1000A is provided thereon with a plurality of the labels 100. The back surface 100B of each label 100 adheres to the release paper by the adhesive provided on the back surface 100B. Therefore, the first adhesive surface 14B, the second adhesive surface 24B, the third adhesive surface 12B and the fourth adhesive surface 22B of the back surface 100B of the label 100 adhere to the release paper. In addition, the label paper 1000A is cut (half cut; the release paper is not completely cut), depending on an outline of each label 100. Therefore, the operator can peel off and use each label 100 from the release paper. For example, a part of the label paper 1000A in which the labels 100 are not formed is peeled off from the release paper, and hence, each label 100 is put in a state where it can be easily peeled off from the release paper. Thereafter, the required number of the labels 100 can be peeled off and used from the release paper.

As shown in FIG. 5, a plurality of the labels 100 is aligned in the second direction D2 on the label sheet 1000. Here, a part of the first protruding portion 14 of the first label 100 is provided in a position in which it is different from a part of the second protruding portion 24 of the second label 100 adjacent to the first label 100 in the second direction D2 with respect to the first direction D1 and is the same as the part of the second protruding portion 24 of the second label 100 with respect to the second direction D2. Therefore, the labels 100 can be provided at a high density on the label sheet 1000.

In addition, as shown in FIG. 5, the plurality of labels 100 may also be aligned in the first direction D1.

As described above, according to the label 100 of the present embodiment, after the label 100 is wrapped around the cable, a part to be discarded or a part remaining on the cable can be eliminated. The front surface 100A is a non-adhesive surface on which neither the bonding agent nor the bonding agent is provided, and the back surface 100B is an adhesive surface on which the adhesive is provided. Therefore, it is not necessary to provide one surface with both the adhesive surface and the non-adhesive surface. Therefore, it is possible to easily manufacture a plurality of labels that can be wrapped around a cable.

Note that, since the perforation P1 and the like are provided so as to assist the bending of the label 100, they are not necessarily required. On the other hand, the perforation may be provided at another portion. For example, the perforation may be provided at a boundary between the first protruding portion 14 and the first bonding portion 12. Further, processing of forming a "fold line" may be performed.

Further, the cut C1 or the cut C2 is not necessarily required. On the other hand, the cut may be provided at another portion. For example, the cut may be provided at the boundary between the first protruding portion 14 and the first bonding portion 12.

Further, each shape of the first protruding portion, the first bonding portion, the second protruding portion and the second bonding portion can be diversely changed. In addition, the second direction D2 and the third direction D3 are orthogonal to the first direction D1 and are opposite directions. Therefore, end portions on opposite sides, as compared to the label 100, may be configured to protrude by setting the second direction D2 shown in the drawings as the third direction D3 and setting the third direction D3 as the second direction D2.

The present disclosure further provides labels shown in following embodiments.

Second Embodiment

Figure 6A:
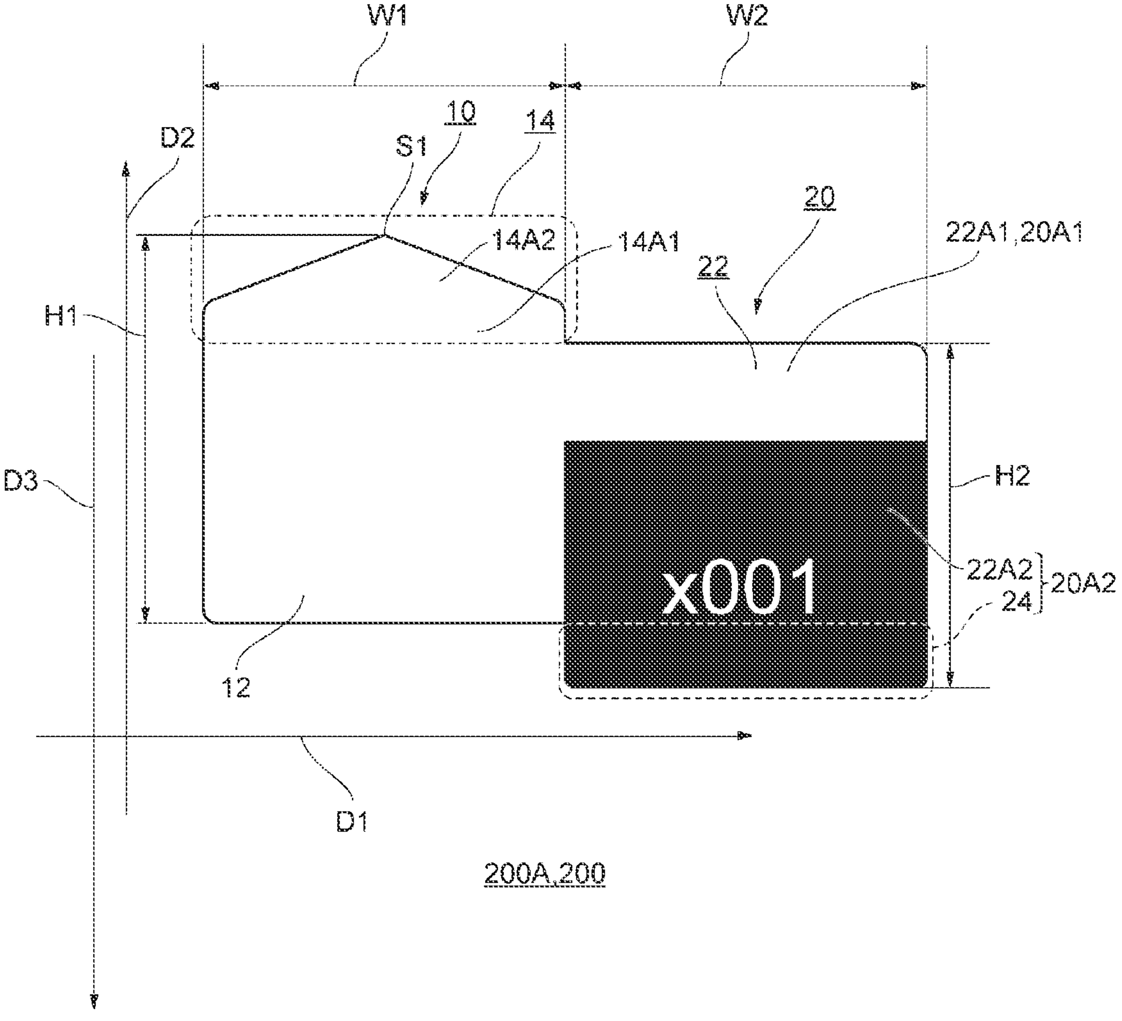
FIG. 6A shows a front surface 200A of a label 200.
Figure 6B:
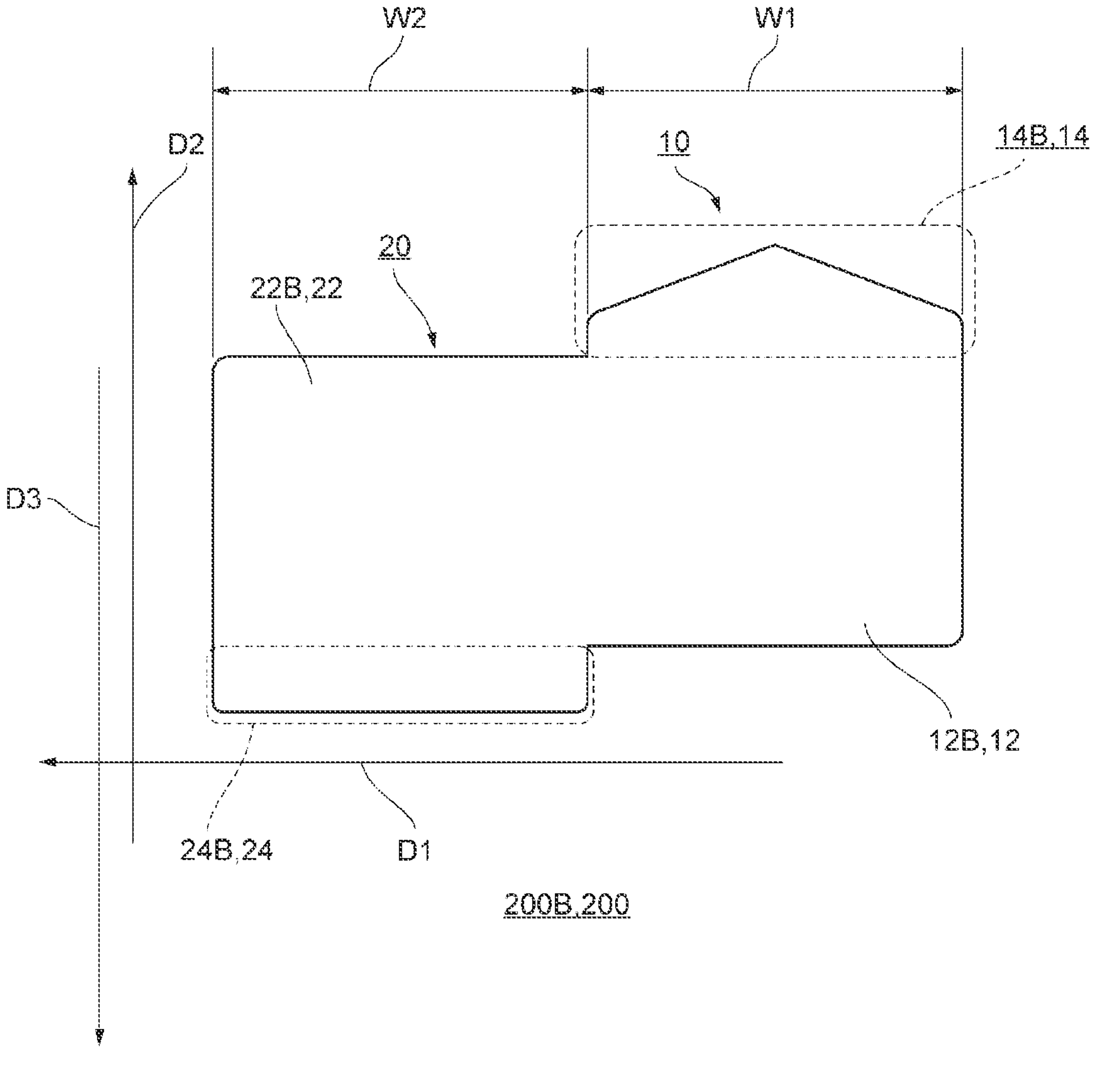
FIG. 6B shows a back surface 200B of the label 200.

FIG. 6A shows a front surface 200A of a label 200 according to a second embodiment, and FIG. 6B shows a back surface 200B of the label 200. Note that, the configurations that are similar to those of the label 100 of the first embodiment are denoted with the same reference signs, and the descriptions thereof are omitted.

As shown in FIG. 6, the front surface 200A of the label 200 is a printable non-adhesive surface on which neither the adhesive nor the bonding agent is applied, and the back surface 200B is an adhesive surface on which the adhesive is applied.

The label 200 has a first part 10, and a second part 20. The first part 10 has a first bonding portion 12 and a first protruding portion 14. The first protruding portion 14 has a rectangular portion 14A1 and a tip end portion 14A2. The second part 20 has a second bonding portion 22 and a second protruding portion 24. The second part 20 has an overlap width area 20A1 and a print area 20A2.

Further, in the back surface 200B of the label 200, the entire area of the back surface of the first protruding portion 14 is provided with a first adhesive surface 14B, the entire area of the back surface of the first bonding portion 12 is provided with a third adhesive surface 12B, the entire area of the back surface of the second protruding portion 24 is provided with a second adhesive surface 24B, and the entire area of the back surface of the second bonding portion 22 is provided with a fourth adhesive surface 22B.

Unlike the label 100, the label 200 is not provided with any of the perforation P1, the cut C1 and the cut C2.

The operator can bend the label 200 along a boundary between the first part 10 and the second part 20 (i.e., along a connection portion of the first part 10 and the second part 20, which extends in the second direction D2) by bending the label 200 so that an end portion (a left end in FIG. 6A) of the first part 10 is substantially matched with an end portion (a right end in FIG. 6A) of the second part 20, thereby causing the third adhesive surface 12B and the fourth adhesive surface 22B to adhere to each other so that the first part 10 and the second part 20 overlap each other. At this time, the first protruding portion 14 of the end portion of the first part 10 in the second direction D2 is exposed toward one side, and the second protruding portion 24 of the end portion of the second part 20 in the third direction D3 is exposed toward the other side.

As a result, the label 200 has a similar configuration to the label 100 shown in FIG. 2A and FIG. 2C. Therefore, it is possible to wrap the label 200 around the cable by performing the steps shown in (A) to (E) of FIG. 4.

As described above, according to the label 200 of the present embodiment, it is possible to eliminate a part to be discarded or a part remaining on the cable after the label is wrapped around the cable. Further, the similar effects are achieved with respect to the configurations common to the labels of other embodiments. Note that, it is not necessarily required that the end portion of the first part 10 should be completely matched with the end portion of the second part 20. Even when both the end portions are misaligned without completely overlapping each other, the bonding force of a sticking-out portion is limited, so that there is no major hindrance to wrapping around the cable. Note that, since it is possible to omit the formation of the perforation and the like, it is possible to improve the throughput.

Third Embodiment

Figure 7A:
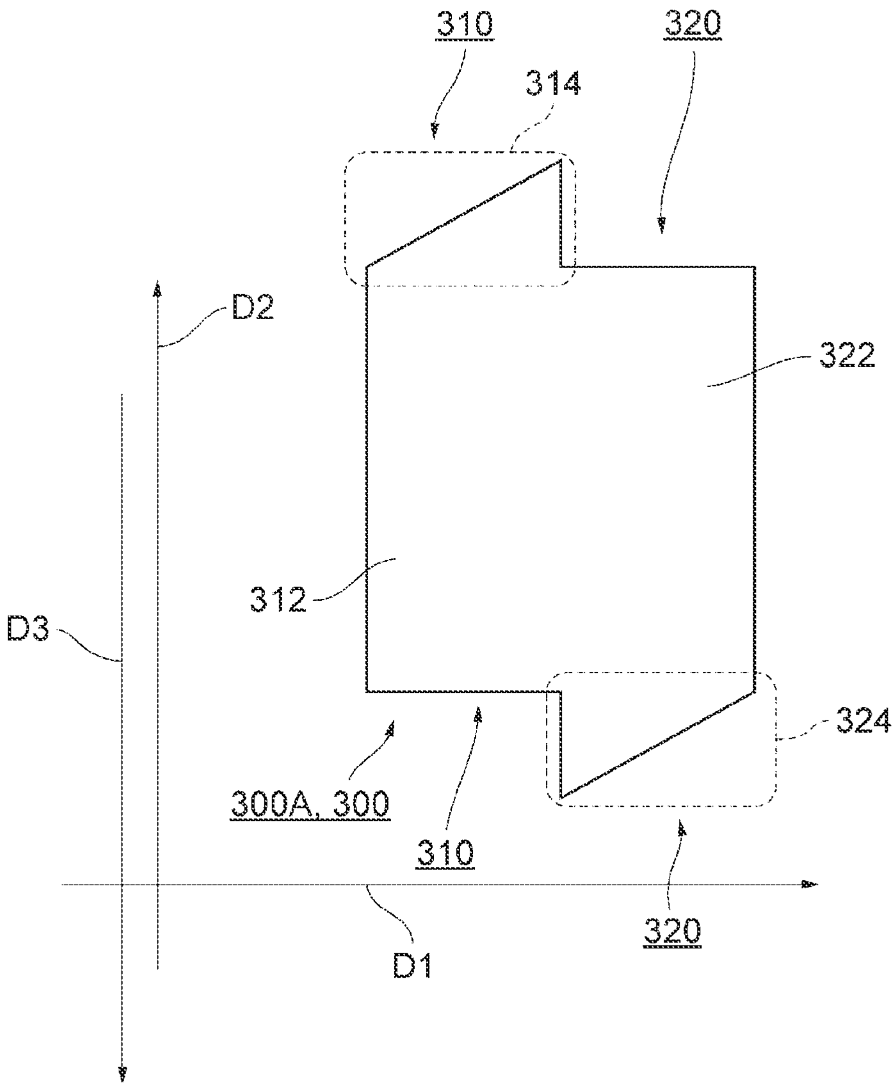
FIG. 7A shows a front surface 300A of a label 300.

FIG. 7A shows a front surface 300A of a label 300 according to a third embodiment. Note that, the configurations that are similar to those of the other embodiments are denoted with the same reference signs, and the descriptions thereof are omitted.

The front surface 300A of the label 300 is a printable non-adhesive surface on which neither the adhesive nor the bonding agent is applied, and the back surface is an adhesive surface on which the adhesive is applied.

The label 300 has a first part 310, and a second part 320. The first part 310 has a first bonding portion 312 and a first protruding portion 314. The first protruding portion 314 has a portion whose width in the first direction D1 becomes gradually smaller in the second direction D2. More specifically, the first protruding portion 314 has a right triangular shape whose apex is located at a tip end in the second direction D1 and at a position of a connection portion of the first part 310 and the second part 320 in the first direction D1. The second part 320 has a second bonding portion 322, and a second protruding portion 324. The second protruding portion 324 has a portion whose width in the first direction D1 becomes gradually smaller in the third direction D3. More specifically, the second protruding portion 324 has a right triangular shape whose apex is located at a tip end in the third direction D3 and at a position of a connection portion of the first part 310 and the second part 320 in the second direction D2. Further, in the back surface of the label 300, the entire area of the back surface of the first protruding portion 314 is provided with a first adhesive surface, the entire area of the back surface of the first bonding portion 312 is provided with a third adhesive surface, the entire area of the back surface of the second protruding portion 324 is provided with a second adhesive surface, and the entire area of the back surface of the second bonding portion 322 is provided with a fourth adhesive surface.

The operator can bend the label 300 along a boundary between the first part 310 and the second part 320 (i.e., along a connection portion of the first part 310 and the second part 320, which extends in the second direction) by bending the label 300 so that an end portion (a left end in FIG. 7A) of the first part 310 is substantially matched with an end portion (a right end in FIG. 7A) of the second part 320, thereby causing the third adhesive surface and the fourth adhesive surface to adhere to each other so that the first part 310 and the second part 320 overlap each other. At this time, the first protruding portion 314 of the end portion of the first part 310 in the second direction D2 is exposed toward one side, and the second protruding portion 324 of the end portion of the second part 320 in the third direction D3 is exposed toward the other side.

Therefore, it is possible to wrap the label 300 around the cable by performing the steps shown in (A) to (E) of FIG. 4.

As described above, according to the label 300 of the present embodiment, it is possible to eliminate a part to be discarded or a part remaining on the cable after the label is wrapped around the cable. Further, the similar effects are achieved with respect to the configurations common to the labels of the other embodiments.

Figure 7B:
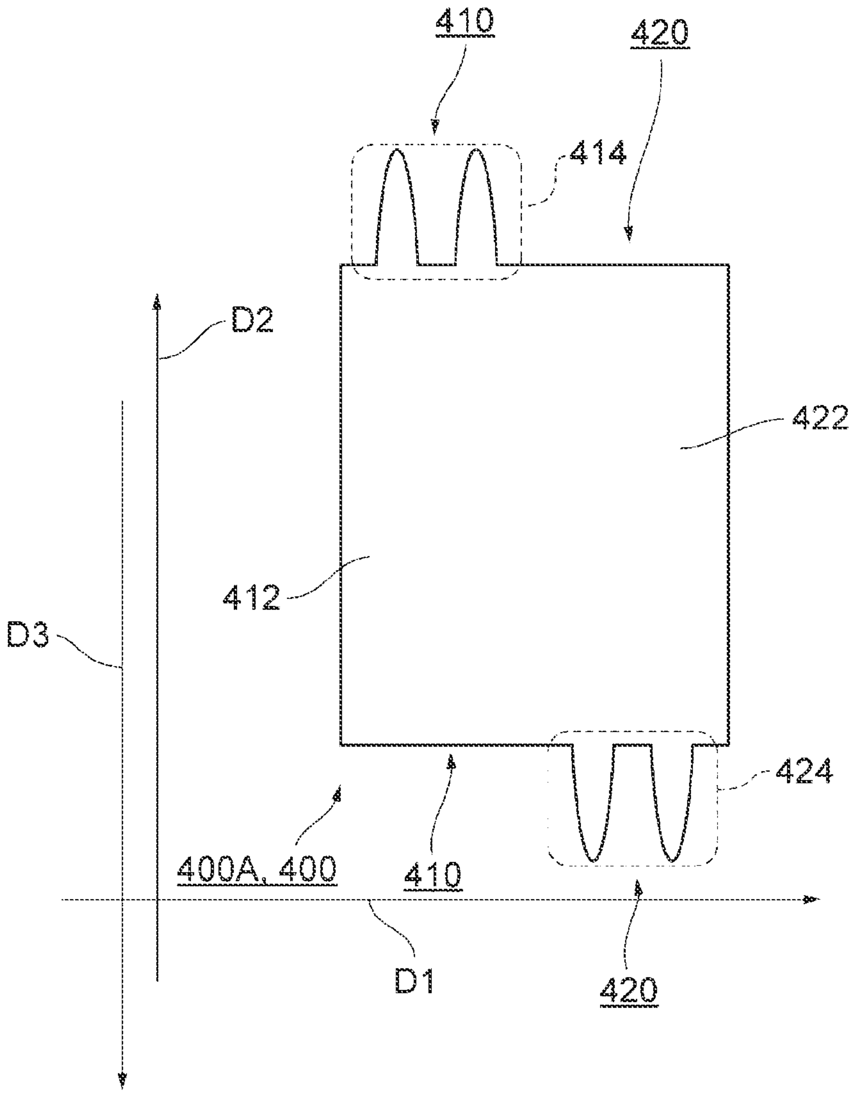
FIG. 7B shows a front surface 400A of a label 400.

FIG. 7B shows a front surface 400A of a label 400 according to a modified embodiment of the label 300 of the third embodiment. Note that, the configurations that are similar to those of the other embodiments are denoted with the same reference signs, and the descriptions thereof are omitted.

The label 400 has a first part 410, and a second part 420, and the first part 410 has a first bonding portion 412, and a first protruding portion 414. The first protruding portion 414 has a portion whose width in the first direction D1 becomes gradually smaller in the second direction D2. More specifically, the first protruding portion 414 has two semi-elliptical shapes provided spaced from each other. The second part 420 has a second bonding portion 422, and a second protruding portion 424. The second protruding portion 424 has a portion whose width in the first direction D1 becomes gradually smaller in the third direction D3. More specifically, the second protruding portion 424 has two semi-elliptical shapes provided spaced from each other. Further, in the back surface of the label 400, the entire area of the back surface of the first protruding portion 414 is provided with a first adhesive surface, the entire area of the back surface of the first bonding portion 412 is provided with a third adhesive surface, the entire area of the back surface of the second protruding portion 424 is provided with a second adhesive surface, and the entire area of the back surface of the second bonding portion 422 is provided with a fourth adhesive surface.

Even with the configuration, it is possible to wrap the label 400 around the cable by performing the steps shown in (A) to (E) of FIG. 4.

As described above, according to the label 400 of the present embodiment, it is possible to eliminate a part to be discarded or a part remaining on the cable after the label is wrapped around the cable.

Note that, three or more protruding portions spaced from each other may also be provided, instead of the two protruding portions. The shape of the protruding portion may be a semicircular shape, a polygonal shape or other shape.

Further, an area of the second protruding portion may be formed to be greater than an area of the first protruding portion, and the bonding force of the second protruding portion may be configured to be greater than the bonding force of the first protruding portion. For example, only the shape of the second protruding portion 424 of the first protruding portion 414 and the second protruding portion 424 may be modified to have a rectangular shape. By this configuration, the bonding force of the second protruding portion 424 can be improved, so that it is possible to make it difficult for the second protruding portion to be peeled off after adhering to an end portion of the second part 420 in the second direction D2.

Fourth Embodiment

Figure 8:
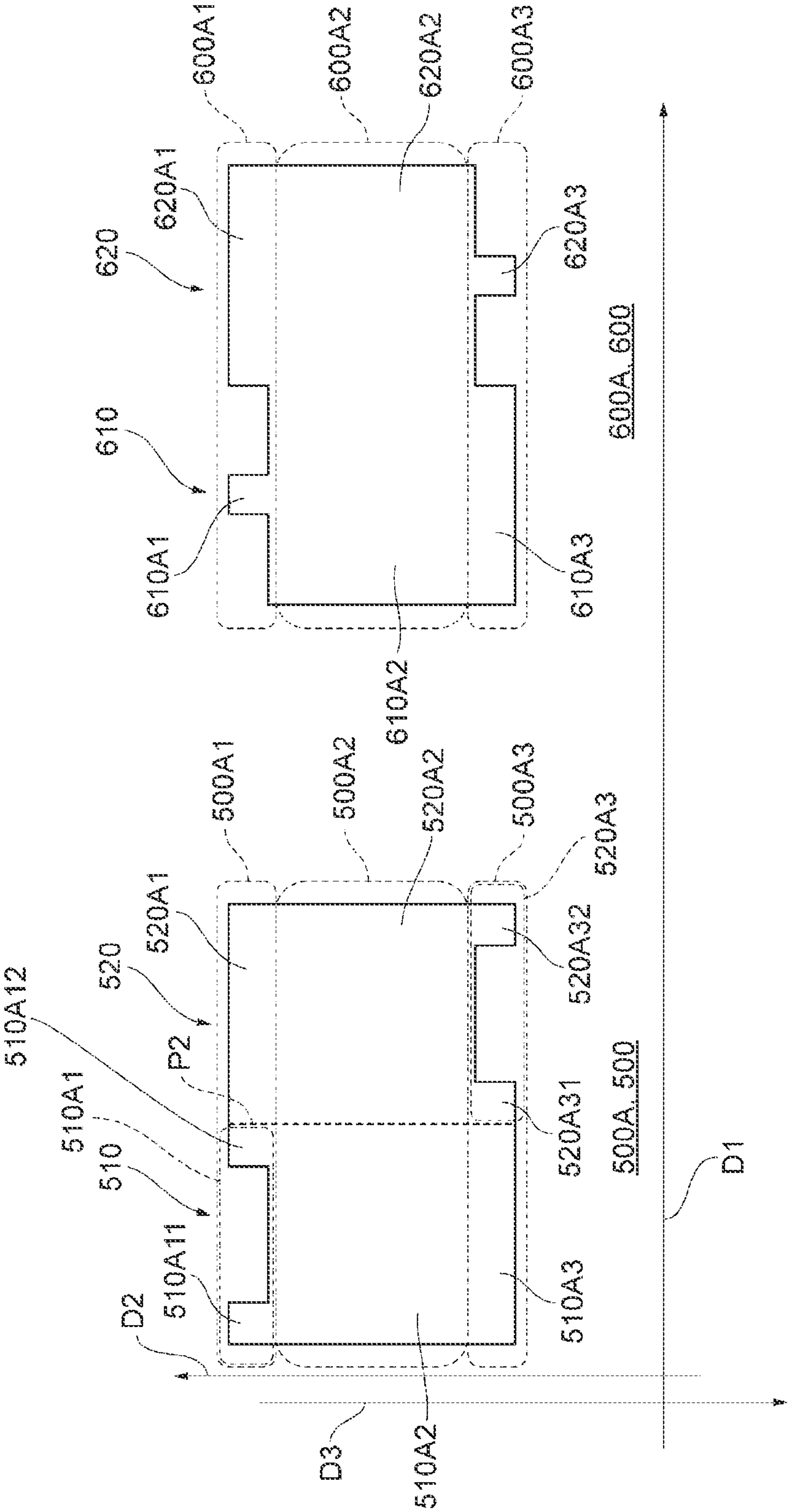
FIG. 8 shows a front surface 500A of a label 500 and a front surface 600A of a label 600.

FIG. 8 shows a front surface 500A of a label 500 according to a fourth embodiment and a front surface 600A of a label 600 according to a modified embodiment of the label 500. Note that, the configurations that are similar to those of the other embodiments are denoted with the same reference signs, and the descriptions thereof are omitted.

The label 500 and the label 600 according to the present embodiment are not provided with configurations corresponding to the first protruding portion and the second protruding portion shown in the other embodiments. However, the labels are each configured such that, when bending the label 500; 600 so that a first part 510; 610 and the second part 520; 620 overlap each other, the adhesive surface of an end portion 510A3; 610A3 of the first part 510; 610 in the third direction D3 is exposed toward one side (the back surface-side of the first part 510; 610) and the adhesive surface of an end portion 520A1; 620A1 of the second part 520; 620 in the second direction D2 is exposed toward the other side (the front surface-side of the first part 510; 610).

The front surface 500A of the label 500 is a printable non-adhesive surface on which neither the bonding agent nor the adhesive is applied, and the back surface is an adhesive surface on which the adhesive is applied.

The label 500 has the first part 510, and the second part 520 adjacent to the first part 510 in the first direction D1. An area of an end portion 510A1 of the first part 510 in the second direction D2 is set to be smaller than an area of an end portion 520A1 of the second part 520 in the second direction D2. Further, an area of an end portion 510A3 of the first part 510 in the third direction D3 is set to be greater than an area of an end portion 520A3 of the second part 520 in the third direction D3.

In the present embodiment, the end portion 510A1 in the second direction D2 is provided with two convex portion 510A11 and convex portion 510A12 each having a convex shape. The convex portion 510A11 and the convex portion 510A12 are spaced from each other in the first direction D1. Further, the end portion 510A3 in the third direction D3 has a rectangular shape, and an intermediate portion 510A2 sandwiched by the end portion 510A1 and the end portion 510A3 also has a rectangular shape. Specifically, the intermediate portion 510A2 is adjacent to the end portion 510A1, which consists of the convex portion 510A11 and the convex portion 510A1, in the second direction D2, and is adjacent to the end portion 510A3 in the third direction D3. In the second direction D2, a height of the intermediate portion 510A2 is twice or greater as large as heights of the convex portion 510A11 and the convex portion 510A12, and is twice or greater as large as a height of the end portion 510A3.

The end portion 520A1 of the second part 520 in the second direction D2 has a rectangular shape, and the end portion 520A3 in the third direction D3 is provided with a convex portion 520A31 and a convex portion 520A32 each having a convex shape. The convex portion 520A31 and the convex portion 520A32 are spaced from each other. An intermediate portion 520A2 sandwiched by the end portion 520A1 and the end portion 520A3 has a rectangular shape. Specifically, the intermediate portion 520A2 is adjacent to the end portion 520A3, which consists of the convex portion 520A31 and the convex portion 520A32, in the third direction D3 and is adjacent to the end portion 520A1 in the second direction D2. Further, the intermediate portion 510A2 is adjacent to the intermediate portion 520A2 in the first direction D1. Further, a perforation P2 extending in the second direction D2 is formed at a boundary between the first part 510 and the second part 520.

As a result of the above configuration, when bending the label 500 along the perforation P2 so that the first part 510 and the second part 520 overlap each other, the end portion 520A3 of the second part 520 overlap the end portion 510A3 of the first part 510. At this time, since an area of the end portion 520A3 of the second part 520 is smaller than an area of the end portion 510A3 of the first part 510, the adhesive surface of the back surface of the end portion 510A3 of the first part 510 is exposed toward one side (the back surface-side of the first part 510). In addition, the end portion 520A1 of the second part 520 overlap the end portion 510A1 of the first part 510. Since an area of the end portion 520A1 of the second part 520 is greater than an area of the end portion 510A1 of the first part 510, the adhesive surface of the back surface of the end portion 520A1 of the second part 520 is exposed toward the other side (the front surface-side of the first part 510).

Therefore, it is possible to wrap the label 500 around the cable by performing the steps shown in (A) to (E) of FIG. 4. Further, by adjusting the number of the convex portion 510A11 and the like, the number of the convex portion 520A31 and the like, and the widths in the first direction D1 and shapes thereof, it is possible to adjust an exposed area of the adhesive surface of the back surface of the end portion 520A1 of the second part 520, i.e., the bonding force when bending the first part 510 and the second part 520.

The front surface 600A of the label 600 according to a modified embodiment of the label 500 is a printable non-adhesive surface on which neither the bonding agent nor the adhesive is applied, and the back surface is an adhesive surface on which the adhesive is applied. Hereinafter, the descriptions of the similar configurations to the label 500 and the parts that can be understood by one skilled in the art are simplified or omitted, and different parts are mainly described.

The label 600 has a first part 610, and a second part 620. An area of an end portion 610A1 of the first part 610 in the second direction D2 is set to be smaller than an area of an end portion 620A1 of the second part 620 in the second direction D2. In addition, an area of an end portion 610A3 of the first part 610 in the third direction D3 is set to be greater than an area of an end portion 620A3 of the second part 620 in the third direction D3.

In the present modified embodiment, the end portion 610A1 of the first part 610 is configured as a convex portion 610A1 having a convex shape, and the end portion 610A3 has a rectangular shape as a whole. In addition, an intermediate portion 610A2 sandwiched by the end portion 610A1 and the end portion 610A3 has a rectangular shape. The intermediate portion 610A2 is adjacent to the end portion 610A1 in the second direction D2 and is adjacent to the end portion 610A3 in the third direction D3.

Note that, the end portion 620A1 of the second part 620 has a rectangular shape as a whole, and the end portion 620A3 is configured as a convex portion 620A3 having a convex shape. In addition, an intermediate portion 620A2 sandwiched by the end portion 620A1 and the end portion 620A3 has a rectangular shape. The intermediate portion 620A2 is adjacent to the end portion 620A3 in the third direction D3, and is adjacent to the end portion 620A1 in the second direction D2. Further, the intermediate portion 610A2 is adjacent to the intermediate portion 620A2 in the first direction D1. In the present modified embodiment, a boundary between the first part 610 and the second part 620 is not formed with a perforation.

When the operator bends the label 600 so that the first part 610 and the second part 620 overlap each other, the adhesive surface provided in the back surface of the end portion 620A1 of the second part 620 in the second direction D2, which has an area greater than an area of the end portion 610A1 of the first part 610 in the second direction D2, is exposed toward the other side (the front surface-side of the first part 610), and the adhesive surface provided in the back surface of the end portion 610A3 of the first part 610 in the third direction D3, which has an area greater than an area of the end portion 620A3 of the second part 620 in the third direction D3, is exposed toward one side (the back surface-side of the first part 610). Therefore, it is possible to wrap the label 600 around the cable by performing the steps shown in (A) to (E) of FIG. 4.

As described above, according to the label 500 and the label 600 shown in the present embodiment, it is possible to eliminate a part to be discarded or a part remaining on the cable after the label is wrapped around the cable. Further, the similar effects are achieved with respect to the configurations common to the labels of other embodiments.

Fifth Embodiment

Figure 9:
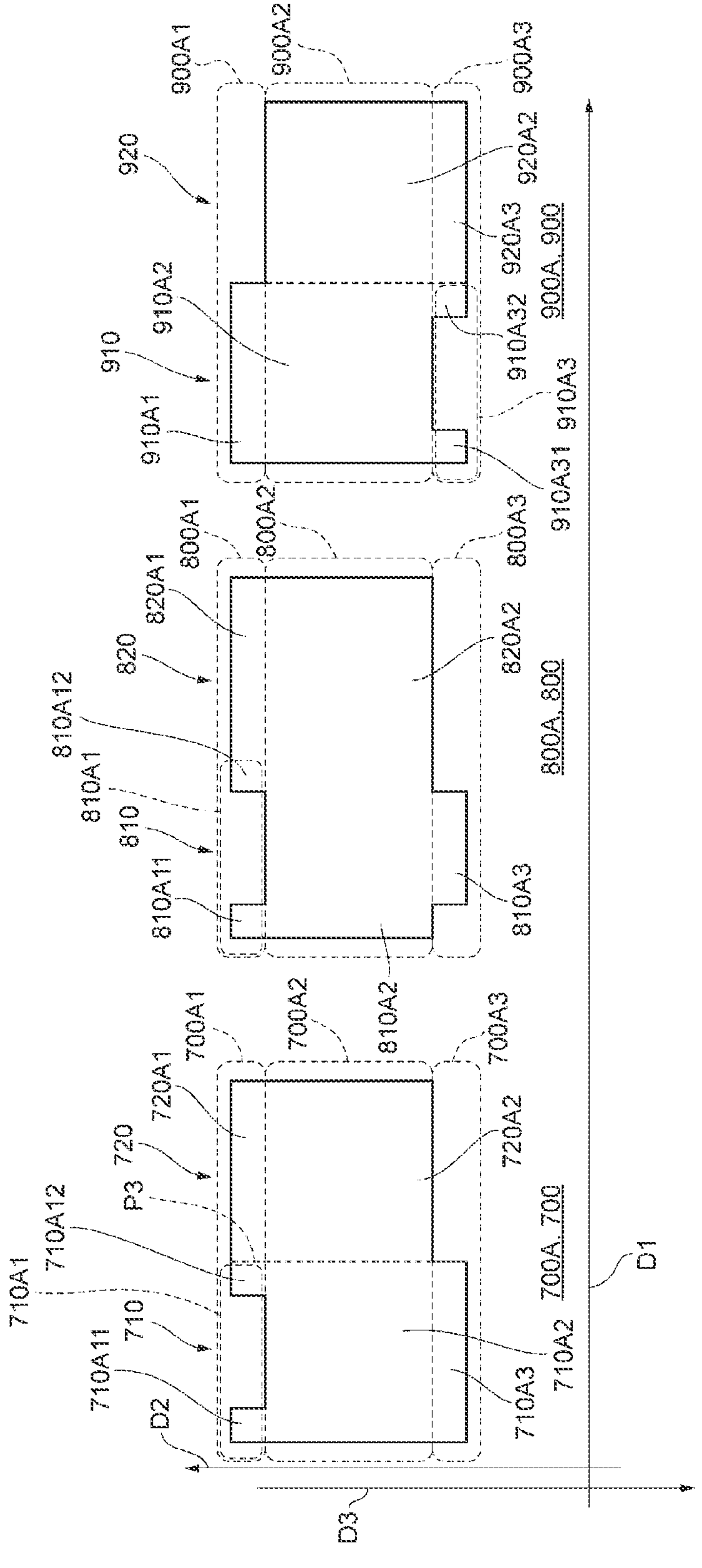
FIG. 9 shows a front surface 700A of a label 700, a front surface 800A of a label 800 and a front surface 900A of a label 900.

FIG. 9 shows a front surface 700A of a label 700 according to a fifth embodiment, and a front surface 800A of a label 800 and a front surface 900A of a label 900 according to a modified embodiment of the label 700. Note that, the configurations that are similar to those of the other embodiments are denoted with the same reference signs, and the descriptions thereof are omitted.

The labels 700, 800 and 900 of the present embodiment are not provided with the configuration where both the first protruding portion and the second protruding portion shown in the other embodiments are provided, and only one of the first part and the second part protrudes in the second direction D2 or in the third direction D3. However, the labels are each configured such that, when bending the label so that the first part and the second part overlap each other, the adhesive surface of the end portion of the first part in the second direction D2 or in the third direction D3 is exposed toward one side and the adhesive surface of the end portion of the second part in the third direction D3 or in the second direction D2 is exposed toward the other side.

The front surface 700A, the front surface 800A and the front surface 900A of the label 700, the label 800 and the label 900 are all printable non-adhesive surfaces on which neither the bonding agent nor the adhesive is applied, and the back surfaces are adhesive surfaces on which the adhesive is applied.

The label 700 has a first part 710, and a second part 720 adjacent to the first part 710 in the first direction D1. An area of an end portion 710A1 of the first part 710 in the second direction D2 is set to be smaller than an area of an end portion 720A1 of the second part 720 in the second direction D2. In addition, in an area of an end portion 700A3 in the third direction D3 of the entire label 700, the second part 720 is not provided with an area corresponding to an end portion 710A3 of the first part 710.

In the present embodiment, the end portion 710A1 in the second direction D2 is provided with two convex portion 710A11 and convex portion 710A12 each having a convex shape. The convex portion 710A11 and the convex portion 710A12 are spaced from each other in the first direction D1. Further, the end portion 710A3 in the third direction D3 has a rectangular shape, and an intermediate portion 710A2 sandwiched by the end portion 710A1 and the end portion 710A3 also has a rectangular shape. Specifically, the intermediate portion 710A2 is adjacent to the convex portion 710A11 and the convex portion 710A1 in the second direction D2, and is adjacent to the end portion 710A3 in the third direction D3. In the second direction D2, a height of the intermediate portion 710A2 is twice or greater as large as heights of the convex portion 710A11 and the convex portion 710A12, and is twice or greater as large as a height of the end portion 710A3.

The end portion 720A1 of the second part 720 in the second direction D2 has a rectangular shape, and the intermediate portion 720A2 adjacent to the end portion 720A1 in the third direction D3 also has a rectangular shape. The intermediate portion 720A2 becomes an end portion of the second part 720 in the third direction D3. At the end portion 700A3 on the other side, the second part 720 is not provided. The intermediate portion 720A2 is adjacent to the end portion 720A1 in the second direction D2. The intermediate portion 710A2 is adjacent to the intermediate portion 720A2 in the first direction D1. In the present embodiment, a boundary between the first part 710 and the second part 720 is formed with a perforation P3. The perforation P3 extends in the second direction D2.

As a result of the above configuration, when bending the label 700 along the perforation P3 so that the first part 710 and the second part 720 overlap each other, in the area of the end portion 700A3 in the third direction D3 of the entire label 700, the second part 720 is not provided with an area corresponding to the end portion 710A of the first part 710, so that the adhesive surface of the back surface of the end portion 710A3 of the first part 710 is exposed toward one side (the back surface-side of the first part 710). In addition, the end portion 720A1 of the second part 720 overlaps the end portion 710A1 of the first part 710. At this time, since the area of the end portion 720A1 of the second part 720 is greater than the area of the end portion 710A1 of the first part 710, the adhesive surface of the back surface of the end portion 720A1 of the second part 720 is exposed toward the other side (the front surface-side of the first part 710). Therefore, it is possible to wrap the label 700 around the cable by performing the steps shown in (A) to (E) of FIG. 4.

The label 800 according to a modified embodiment of the label 700 has a first part 810, and a second part 820. An area of an end portion 810A1 of the first part 810 in the second direction D2 is set to be smaller than an area of an end portion 820A1 of the second part 820 in the second direction D2. In an area of the end portion 800A3 of the entire label 800 in the third direction D3, the second part 820 is not provided with an area corresponding to the first part 810A3.

In the present embodiment, the first part 810 has an end portion 810A1 having two convex portion 810A11 and convex portion 810A12 at an end portion in the second direction D2, has a rectangular end portion 810A3 at an end portion in the third direction D3, and has a rectangular intermediate portion 810A2 at an intermediate portion 800A2. Here, a width of the end portion 810A3 in the first direction D1 is set to be smaller than a width of the intermediate portion 810A2 in the first direction D1. In the third direction D3, a height of the intermediate portion 810A2 is preferably twice or greater as large as heights of the end portion 810A11 and the end portion 810A12, and is also preferably twice or greater as large as a height of the end portion 810A3.

On the other hand, the end portion 820A1 of the second part 820 in the second direction D2 has a rectangular shape, and the intermediate portion 820A2 also has a rectangular shape. The intermediate portion 820A2 becomes an end portion of the second part 820 in the third direction D3. At the end portion 800A3, the second part 820 is not provided. The intermediate portion 820A2 is adjacent to the end portion 820A1 in the second direction D2. Note that, the label 800 of the present modified embodiment is not formed with a perforation.

The label 800 configured as described above can achieve the similar operational effects to the label 700.

The label 900 according to a modified embodiment of the label 700 has a first part 910, and a second part 920. In an area of the end portion 900A1 of the entire label 900 in the second direction D2, the second part 920 is not provided with an area corresponding to the first part 910A1. In addition, in an area of an end portion 900A3 of the entire label 900 in the third direction D3, an area of an end portion 910A3 of the first part 910 in the third direction D3 is set to be smaller than an area of an end portion 920A3 of the second part 920 in the third direction D3.

Even with the configuration, since the area of one of the first part and the second part is large at one end, and the area of the other of the first part and the second part is large at the other end, when the label is bent so that both the first part and the second part overlap each other, the adhesive surface of one of the first part and the second part can be exposed at one end, and the adhesive surface of the other can be exposed at the other end.

In the present modified embodiment, the first part 910 is provided at the end portion 900A1 on one side (in the second direction D2) with the rectangular end portion 910A1 and is provided at the end portion 900A3 on the other side (in the third direction D3) with the two spaced convex portion 910A31 and convex portion 910A32, and the intermediate portion 910A2 sandwiched by the end portion 910A1 and the end portion 910A3 has a rectangular shape. The intermediate portion 910A2 is adjacent to the end portion 910A1 in the second direction D2, and is adjacent to the end portion 910A3 in the third direction D3. Note that, the rectangular intermediate portion 920A2 of the second part 920 becomes an end portion of the second part 920 in the second direction D2. The end portion 920A3 in the third direction D3 also has a rectangular shape. The intermediate portion 920A2 is adjacent to the end portion 920A3 in the third direction D3.

The second part 920 is not provided with an area corresponding to the end portion 910A1 of the first part. An area of the end portion 910A3 of the first part 810 in the third direction D3 is set to be smaller than an area of the end portion 920A3 of the second part 920 in the third direction D3.

Even with the label 900 configured as described above, it is possible to achieve the similar operational effects to the label 700.

The label 200 to the label 900 may be provided plurally on a label sheet similar to the label sheet 1000. The label sheet has, for example, a release paper and a label paper bonded to the release paper, and the label paper is provided with a plurality of one or more types of the label 200 to the label 900. A front surface of the label paper is a non-adhesive surface on which neither the bonding agent nor the adhesive is provided, and a back surface thereof is an adhesive surface on which the adhesive is provided. Therefore, since it is not necessary to provide one surface with both the adhesive surface and the non-adhesive surface, it is possible to easily manufacture a plurality of labels that can be wrapped around a cable.

Sixth Embodiment

The label 100 of the first embodiment has such configuration that the first surface 100C shown in FIG. 2A and the second surface 100D shown in FIG. 2B are provided by bending the label 100 along the perforation P1 to cause the third adhesive surface 12B and the fourth adhesive surface 22B to adhere to each other and to stack the first part 10 and the second part 20.

A label 1100 of the present embodiment implements a configuration equivalent to the configuration having the first surface 100C shown in FIG. 2A and the second surface 100D shown in FIG. 2B, without stacking.

Figure 10A:
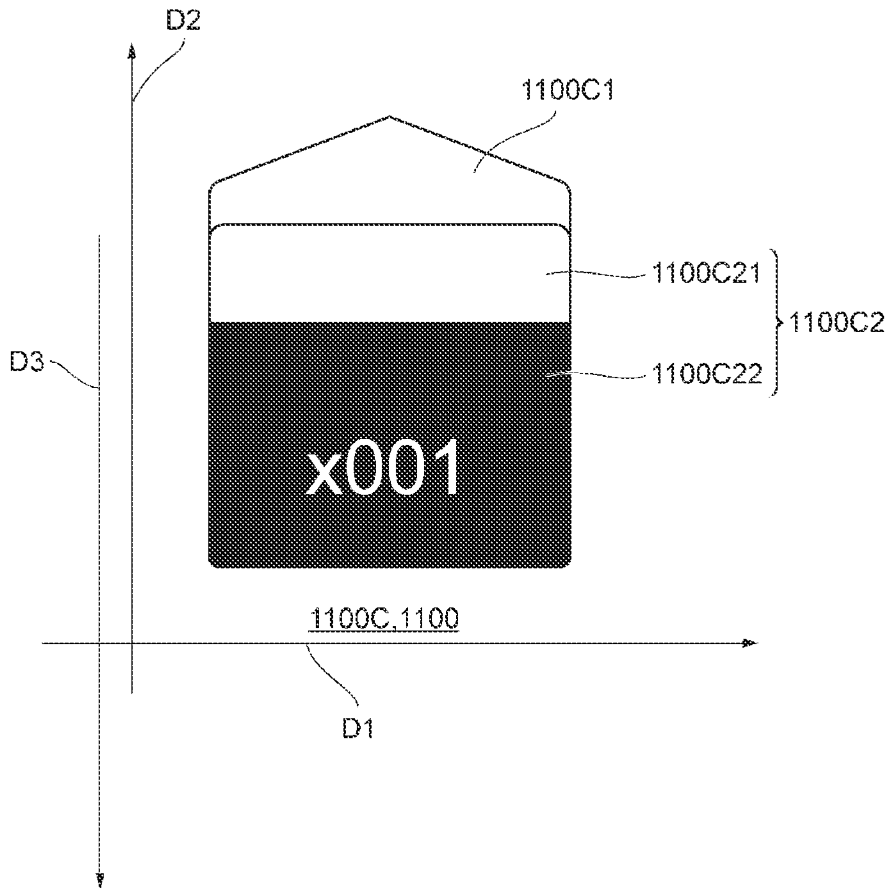
FIG. 10A shows a front surface 1100A of a label 1100.
Figure 10B:
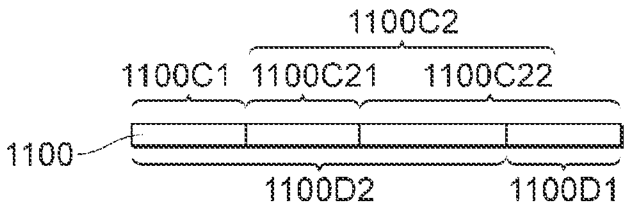
FIG. 10B is a side view of the label 1100.
Figure 10B:
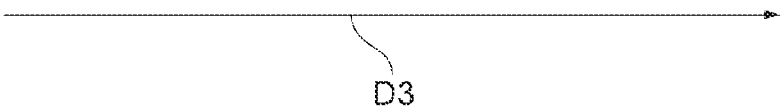

FIG. 10A shows a first surface 1100C of the label 1100. FIG. 10B is a side view of the label 1100. For convenience of descriptions, in FIG. 10B, a thickness of the label 1100 is shown larger than actually.

The first surface 1100C of the label 1100 shown in FIG. 10A is similar to the first surface 100C of the label 100 shown in FIG. 2A and a second surface 1100D of the label 1100 is similar to the second surface 100D of the label 100 shown in FIG. 2B. Therefore, the descriptions thereof are omitted or simplified.

The first surface 1100C is provided with a first non-adhesive surface 1100C2 adjacent to a first adhesive surface 1100C1 in the third direction D3, and the first non-adhesive surface 1100C2 is provided with an overlap width area 1100C21 and a print area 1100C22. For this reason, the first surface 1100C has the first adhesive surface 1100C1 provided at an end portion in the second direction, the overlap width area 1100C21 that is adjacent to the first adhesive surface 1100C1 in the third direction D3 and is a not-printed surface and a non-adhesive surface, and the print area 1100C22 that is adjacent to the overlap width area 1100C21 in the third direction D3 and is a printed surface and a non-adhesive surface. The first adhesive surface 1100C1 is provided at an end portion in the second direction D2, and the print area 1100C22 is provided at an end portion in the third direction D3.

The second surface 1100D of the label 1100 has a second adhesive surface 1100D1 provided at an end portion in the third direction and a second non-adhesive surface 1100D2 adjacent to the second adhesive surface 1100D1 in the second direction D2. The second adhesive surface 1100D1 is provided at an end portion in the third direction D3, and the second non-adhesive surface 1100D2 is provided at an end portion in the second direction D2.

As shown in FIG. 10B, the label 1100 is constituted by a single paper leaf, and a front surface-side of the paper leaf corresponds to the first surface 1100C and a back surface-side thereof corresponds to the second surface 1100D. Therefore, a part of the print area 1100C22 is provided on the front surface-side of the same paper leaf, and the second adhesive surface 1100D1 is provided on the back surface-side of the same part. In addition, the first adhesive surface 1100C1 is provided on the front surface-side of the same paper leaf, and a part of the second non-adhesive surface 1100D2 is provided on the back surface-side of the same part.

Note that, the label of the present embodiment can be favorably applied when a label such as the label 100 of the first embodiment is made of transparent or translucent laminate paper (including a film made of a resin material such as PVC (PolyVinyl Chloride), PET (PolyEthylene Terephthalate) and synthetic paper). For example, a laminate portion can be added to the second part of the label 100 of the first aspect, in addition to the print area. Since printing is not performed on the laminate portion, when the laminate portion is wrapped so as to cover the print area, the front surface of the print area can be protected. In a case where the overlap width area is not provided, the second bonding portion 22 corresponds to the print area and the second protruding portion corresponds to the laminate portion. In the third direction D3, a height of the laminate portion is preferably equal to or greater than a height of the print area. By such configuration, the front surface of the print area can be all covered with the laminate portion. Similarly, the label 200 and the like may also be provided with the laminate portion near the print area.

Even with the label 1100 configured as described above, it is possible to eliminate a part to be discarded or a part remaining on the cable after the label is wrapped around the cable. Further, since the label can be wrapped around the cable without being bent, the workability can be improved. Similarly, a label corresponding to the configuration obtained when the label such as the label 200 to the label 900 is bent may be provided from a single paper leaf.

In the label shown in each embodiment, the adhesive surface is formed by providing the adhesive. However, the adhesive surface may also be formed by providing the bonding agent. However, when the adhesive surface is provided by the adhesive that is not solidified at room temperatures, it is possible to provide a rotating label that can easily rotate relative to a cable.

The present disclosure can be diversely modified without departing from the gist thereof. For example, some constitutional elements in any embodiment can be added to other embodiments within a normal conceivable range of one skilled in the art. In addition, some constitutional elements in any embodiment can be replaced with corresponding constitutional elements in other embodiments. For example, the shape of the first protruding portion according to the first embodiment may be replaced with the shape of the first protruding portion according to other embodiments such as the third embodiment.

The aforementioned embodiments are summarized as follows.

A label of the present disclosure has a front surface and a back surface provided on an opposite side to the front surface and capable of being wrapped around a cable extending in a first direction. The label includes: a first part; and a second part adjacent to the first part in the first direction. The first part has a first protruding portion further protruding than the second part in a second direction perpendicular to the first direction and having a first adhesive surface on the back surface, and the second part has a second protruding portion further protruding than the first part in a third direction opposite to the second direction and having a second adhesive surface on the back surface.

The adhesive surface indicates a surface on which at least one of a bonding agent and an adhesive is provided. Note that, in the present disclosure, the bonding agent means adhering to another object by solidifying to express joint strength at room temperatures, and the adhesive means adhering to another object without solidifying at room temperatures. In the present disclosure, the adhesive surface includes all of a surface on which only the adhesive is provided, a surface on which only the bonding agent is provided and a surface on which both the adhesive and the bonding agent are provided. However, as described later, the adhesive is preferably provided on the adhesive surface.

The first part may have a first width in the first direction and a first height in the second direction, and the second part may have a second width in the first direction and a second height in the second direction. The first width may be the same or substantially the same as the second width. A height of a portion obtained by subtracting a height of the first protruding portion from the first height may be the same or substantially the same as a height of a portion obtained by subtracting a height of the second protruding portion from the second height.

A boundary between the first part and the second part may be formed with a fold extending in the second direction. Here, the term “fold” refers to a part of the label that is easily bent, i.e., the part that bends when the two ends are brought close together due to low bending stiffness, and includes perforations made by intermittently removing at least a portion of the label surface, and cuts made by continuously removing a portion of the label surface. The fold may also be formed by reducing the height of the label in the second direction at the boundary between the first portion and the second portion. Folds here may also include “folding line” formed by applying pressure to the label surface with a metal ball, roller, spatula, and so on to make it easier to fold. The first part may have a third adhesive surface on the back surface of a portion except the first protruding portion. Similarly, the second part may have a fourth adhesive surface on the back surface of a portion except the second protruding portion. The first protruding portion may have a portion whose width in the first direction becomes gradually smaller in the second direction.

A label of the present disclosure has a front surface and a back surface provided on an opposite side to the front surface and capable of being wrapped around a cable extending in a first direction. The label includes a first part; and a second part adjacent to the first part in the first direction. An area of the second part is greater than an area of the first part in an end portion of a second direction perpendicular to a first direction, and the second part has a second adhesive surface in an at least a part of the back surface. The area of the first part is greater than the area of the second part in an end portion of a third direction opposite to a first direction, and the first part has a first adhesive surface in an at least a part of the back surface.

A label of the present disclosure has a front surface and a back surface provided on an opposite side to the front surface and capable of being wrapped around a cable extending in a first direction. The label includes a first part; and a second part adjacent to the first part in the first direction. An area of an end portion of the first part in a second direction perpendicular to the first direction is smaller than an area of an end portion of the second part in the second direction, and a back surface of the end portion of the second part in the second direction has an adhesive surface, and an area of an end portion of the first part in a third direction opposite to the second direction is greater than the area of the end portion of the second part in the second direction, and a back surface of the end portion of the first part in the third direction has a second adhesive surface. Here, the front surface may be a printable non-adhesive surface, and the back surface may be an adhesive surface.

A label of the present disclosure has a front surface and a back surface provided on an opposite side to the front surface and capable of being wrapped around a cable extending in a first direction. The first surface has: a first adhesive surface provided at an end portion in a second direction perpendicular to the first direction, and a first non-adhesive surface adjacent to the first adhesive surface in a third direction opposite to the second direction, and the second surface has: a second adhesive surface provided at an end portion in the third direction, and a second non-adhesive surface adjacent to the second adhesive surface in the second direction.

The label may further include a first part having the first adhesive surface and the second non-adhesive surface, and a second part stacked on the first part and having the second adhesive surface and the first non-adhesive surface.

Furthermore, a label wrapping method is a method for wrapping a label around a cable extending in a first direction, in which the label has a first surface and a second surface provided on an opposite side to the first surface and capable of being wrapped around the cable, the first surface has a first adhesive surface provided at an end portion in a second direction perpendicular to the first direction and a first non-adhesive surface adjacent to the first adhesive surface in a third direction opposite to the second direction, and the second surface has a second adhesive surface provided at an end portion in the third direction and a second non-adhesive surface adjacent to the second adhesive surface in the second direction. The label wrapping method includes: causing the first adhesive surface to adhere to the cable; folding the label so that the second surface faces the cable; wrapping the label around the cable so that the first surface is exposed; and causing the second adhesive surface to adhere to the first surface.

The label wrapping method may further comprising moving the label relative to the cable to peel off the first adhesive surface from the cable. In addition, a label sheet of the present disclosure has a release paper and a label paper bonded to the release paper. The label paper may have a plurality of the labels as described above, in which the first adhesive surface and the second adhesive surface adhere to the release paper.

A label of the present disclosure has a first surface that is to be an adhesive surface and a second surface that is provided on an opposite side to the first surface and is to be a non-adhesive surface. The label includes: a first part; and a second part adjacent to the first part in the first direction. When bending the label along a boundary between the first part and the second part so that the first part and the second part overlap each other, the adhesive surface of an end portion of the second part in a second direction perpendicular to the first direction is exposed toward one side, and the adhesive surface of an end portion of the first part in a third direction perpendicular to the first direction and opposite to the second direction is exposed toward the other side.

A label of the present disclosure has a first surface that is to be an adhesive surface and a second surface that is provided on an opposite side to the first surface and is to be a non-adhesive surface. The label includes: a first part; and a second part adjacent to the first part in the first direction. When bending the label along a boundary between the first part and the second part so that the first part and the second part overlap each other, the adhesive surface of an end portion of the first part in a second direction perpendicular to the first direction is exposed toward one side, and the adhesive surface of an end portion of the second part in a third direction perpendicular to the first direction and opposite to the second direction is exposed toward the other side.

The invention claimed is:

1. A label having a front surface and a back surface provided on an opposite side to the front surface and capable of being wrapped around a cable extending in a first direction, the label comprising:

a first part; and a second part adjacent to the first part in the first direction, wherein the first part has a first bonding portion connecting to the second part and a first protruding portion protruding further than the second part in a second direction perpendicular to the first direction with respect to the first bonding portion, wherein the second part has a second bonding portion connecting to the first bonding portion and a second protruding portion protruding further than the first part in a third direction opposite to the second direction with respect to the second bonding portion, wherein a height of the first bonding portion in the second direction is the same or substantially the same as a height of the second bonding portion in the second direction, wherein a height of the first protruding portion in the second direction is smaller than half of the height of the first bonding portion, wherein each of back surfaces of the first bonding portion, the first protruding portion, the second bonding portion, and the second protruding portion is an adhesive surface, wherein a front surface of the first bonding portion is a non-adhesive surface, wherein a front surface of the second bonding portion is a non-adhesive surface including a print area, wherein the adhesive surface on the back surface of the first protruding portion temporarily adheres to the cable as an anchor for attaching the label to the cable, when the first bonding portion and the second bonding portion are folded along a boundary portion between the first bonding portion and the second bonding portion and the adhesive surfaces thereof are bonded to each other to be wrapped around the cable, and wherein the front surface of the first bonding portion is wrapped inward so as to face a front surface of the cable, and the front surface of the second bonding portion is exposed so that the print area faces outward.

2. The label according to claim 1, wherein the first part has a first width in the first direction that is the same or substantially the same as a second width of the second part in the first direction.

3. The label according to claim 1, wherein the boundary portion is formed with a fold extending in the second direction.

4. The label according to claim 1, wherein the first protruding portion has a portion whose width in the first direction becomes gradually smaller in the second direction.

5. The label according to claim 1, wherein the second part is stacked on the first part.

6. A label sheet having a release paper and a label paper bonded to the release paper, wherein the label paper has a plurality of the labels according to claim 1, in which the adhesive surfaces adhere to the release paper.

7. A label having a front surface and a back surface provided on an opposite side to the front surface and capable of being wrapped around a cable extending in a first direction, the label comprising:

a first part; and a second part adjacent to the first part in the first direction, wherein an area of an end portion of the first part in a second direction perpendicular to the first direction is smaller than an area of an end portion of the second part in the second direction, and a back surface of the end portion of the second part in the second direction has an adhesive surface, and wherein an area of an end portion of the first part in a third direction opposite to the second direction is greater than the area of the end portion of the second part in the second direction, and a back surface of the end portion of the first part in the third direction has a second adhesive surface.

8. The label according to claim 7, wherein the front surface is a printable non-adhesive surface, and wherein the back surface is an adhesive surface.

9. A label wrapping method for wrapping a label around a cable extending in a first direction, the label having a first surface and a second surface provided on an opposite side to the first surface and capable of being wrapped around the cable, the first surface having a first adhesive surface provided at an end portion in a second direction perpendicular to the first direction and a first non-adhesive surface adjacent to the first adhesive surface in a third direction opposite to the second direction, and the second surface having a second adhesive surface provided at an end portion in the third direction and a second non-adhesive surface adjacent to the second adhesive surface in the second direction, the label wrapping method comprising:

causing the first adhesive surface to adhere to the cable;

folding the label so that the second surface faces the cable;

wrapping the label around the cable so that the first surface is exposed; and causing the second adhesive surface to adhere to the first surface.

10. The label wrapping method according to claim 9, further comprising moving the label relative to the cable to peel off the first adhesive surface from the cable.

* * * * *